US011901577B1

(12) United States Patent
Li et al.

(10) Patent No.: US 11,901,577 B1
(45) Date of Patent: Feb. 13, 2024

(54) COVER PLATE ASSEMBLY, BATTERY, AND METHOD FOR ASSEMBLING BATTERY

(71) Applicants: Shenzhen Hairun New Energy Storage Technology Co., Ltd., Guangdong (CN); Xiamen Hithium Energy Storage Technology Co., Ltd., Fujian (CN)

(72) Inventors: Maosong Li, Guangdong (CN); Ziqi Yi, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/192,389

(22) Filed: Mar. 29, 2023

(30) Foreign Application Priority Data

Nov. 14, 2022 (CN) .......................... 202211417886.0

(51) Int. Cl.
*H01M 50/103* (2021.01)
*H01M 50/15* (2021.01)
(Continued)

(52) U.S. Cl.
CPC ..... *H01M 50/3425* (2021.01); *H01M 50/103* (2021.01); *H01M 50/15* (2021.01); *H01M 50/55* (2021.01)

(58) Field of Classification Search
CPC .... H01M 50/561; H01M 50/30; H01M 50/35; H01M 50/367; H01M 50/543;
(Continued)

(56) References Cited

U.S. PATENT DOCUMENTS

2013/0011723 A1\* 1/2013 Cho ................... H01M 50/186
429/179
2022/0311087 A1 9/2022 Meng et al.

FOREIGN PATENT DOCUMENTS

CN 208674254 \* 3/2019 .............. H01M 2/04
CN 208674254 U 3/2019
(Continued)

OTHER PUBLICATIONS

CNIPA, First Office Action for Chinese Patent Application No. 202211417886.0, dated Jan. 13, 2023, 14 pages.
(Continued)

*Primary Examiner* — Amanda J Barrow
(74) *Attorney, Agent, or Firm* — IP Spring

(57) ABSTRACT

A cover plate assembly, a battery, and a method for assembling a battery are provided. The cover plate assembly includes a cover plate, a pole, and an explosion-proof assembly. The cover plate includes a cover plate body and a carrier portion. The cover plate body is disposed around an external periphery of the carrier portion. The carrier portion is recessed from a first surface of the cover plate body. The carrier portion and the cover plate body cooperatively define a first recess communicating with a first through hole defined by the carrier portion. The pole is disposed in the first recess. The pole abuts against the carrier portion. The explosion-proof assembly includes an explosion-proof valve and a protective sheet. The explosion-proof valve and the protective sheet are disposed in a second through hole defined by the pole. The explosion-proof valve is spaced apart from the protective sheet.

9 Claims, 13 Drawing Sheets

(51) Int. Cl.
*H01M 50/55* (2021.01)
*H01M 50/342* (2021.01)

(58) Field of Classification Search
CPC ............ H01M 50/552; H01M 50/553; H01M 50/555; H01M 50/557; H01M 50/308; H01M 50/342; H01M 50/3425; H01M 50/358; H01M 50/375; H01M 50/394
See application file for complete search history.

(56) References Cited

FOREIGN PATENT DOCUMENTS

| | | | | |
|---|---|---|---|---|
| CN | 113328179 A | | 8/2021 | |
| CN | 215451572 U | | 1/2022 | |
| CN | 216120514 | * | 3/2022 | ............ H01M 10/04 |
| CN | 216120514 U | | 3/2022 | |
| CN | 216250918 U | | 4/2022 | |
| CN | 217158371 U | | 8/2022 | |
| CN | 115332719 A | | 11/2022 | |
| CN | 217788584 U | | 11/2022 | |
| IN | 215955376 U | | 3/2022 | |
| WO | 2019178900 A1 | | 9/2019 | |

OTHER PUBLICATIONS

CNIPA, Second Office Action for Chinese Patent Application No. 202211417886.0, dated Feb. 3, 2023, 14 pages.
CNIPA, Notification to Grant Patent Right for Invention for Chinese Patent Application No. 202211417886.0, dated Feb. 19, 2023, 3 pages.

* cited by examiner

PROVIDE A COVER PLATE, WHERE THE COVER PLATE INCLUDES A COVER PLATE BODY AND A CARRIER PORTION CONNECTED WITH EACH OTHER, THE COVER PLATE BODY HAS A FIRST SURFACE AND A SECOND SURFACE OPPOSITE TO EACH OTHER, THE COVER PLATE BODY IS DISPOSED AROUND AN EXTERNAL PERIPHERY OF THE CARRIER PORTION, THE CARRIER PORTION IS RECESSED FROM THE FIRST SURFACE, THE CARRIER PORTION AND THE COVER PLATE BODY COOPERATIVELY DEFINE A FIRST RECESS, AND THE CARRIER PORTION DEFINES A FIRST THROUGH HOLE COMMUNICATING WITH THE FIRST RECESS; AND WHEN THE COVER PLATE ASSEMBLY IS APPLIED TO THE BATTERY, THE FIRST SURFACE IS CLOSER TO IS CLOSER TO AN OUTSIDE OF THE BATTERY THAN THE SECOND SURFACE — S701

PROVIDE A POLE, WHERE THE POLE IS INSERTED INTO THE FIRST RECESS FROM THE FIRST SURFACE OF THE COVER PLATE, THE POLE ABUTS AGAINST THE CARRIER PORTION, THE POLE IS CONFIGURED TO BE ELECTRICALLY CONNECTED WITH A CURRENT COLLECTOR OF THE BATTERY, AND THE POLE DEFINES A SECOND THROUGH HOLE, THE POLE INCLUDES AN ABUTTING PORTION AND A POLE BODY CONNECTED WITH EACH OTHER, THE ABUTTING PORTION IS DISPOSED IN THE FIRST RECESS AND ABUTS AGAINST THE CARRIER PORTION, THE POLE BODY EXCEEDS THE FIRST SURFACE, AND THE SECOND THROUGH HOLE PENETRATES THROUGH THE ABUTTING PORTION AND THE POLE BODY, WHERE THE SECOND THROUGH HOLE INCLUDES A FIRST THROUGH SUB-HOLE AND A SECOND THROUGH SUB-HOLE THAT ARE BENT AND COMMUNICATE WITH EACH OTHER, THE FIRST THROUGH SUB-HOLE PENETRATES THROUGH A SURFACE OF THE ABUTTING PORTION AWAY FROM THE POLE BODY, AND THE SECOND THROUGH SUB-HOLE PENETRATES THROUGH A SURFACE OF THE POLE BODY CONNECTED WITH THE ABUTTING PORTION — S702

PROVIDE AN EXPLOSION-PROOF ASSEMBLY, WHERE THE EXPLOSION-PROOF ASSEMBLY INCLUDES AN EXPLOSION-PROOF VALVE AND A PROTECTIVE SHEET, THE EXPLOSION-PROOF VALVE AND THE PROTECTIVE SHEET ARE DISPOSED IN THE SECOND THROUGH HOLE, THE EXPLOSION-PROOF VALVE IS SPACED APART FROM THE PROTECTIVE SHEET, THE EXPLOSION-PROOF VALVE IS DISPOSED IN THE FIRST THROUGH SUB-HOLE, THE PROTECTIVE SHEET IS DISPOSED IN THE SECOND THROUGH SUB-HOLE, THE EXPLOSION-PROOF VALVE IS CLOSER TO THE SECOND SURFACE THAN THE PROTECTIVE SHEET, AND THE EXPLOSION-PROOF VALVE IS CONFIGURED TO SEAL THE SECOND THROUGH HOLE — S703

FIG. 16

PROVIDE A COVER PLATE, WHERE THE COVER PLATE INCLUDES A COVER PLATE BODY AND A CARRIER PORTION CONNECTED WITH EACH OTHER, THE COVER PLATE BODY HAS A FIRST SURFACE AND A SECOND SURFACE OPPOSITE TO EACH OTHER, THE COVER PLATE BODY IS DISPOSED AROUND AN EXTERNAL PERIPHERY OF THE CARRIER PORTION, THE CARRIER PORTION IS RECESSED FROM THE FIRST SURFACE, THE CARRIER PORTION AND THE COVER PLATE BODY COOPERATIVELY DEFINE A FIRST RECESS, AND THE CARRIER PORTION DEFINES A FIRST THROUGH HOLE COMMUNICATING WITH THE FIRST RECESS; AND WHEN THE COVER PLATE ASSEMBLY IS APPLIED TO THE BATTERY, THE FIRST SURFACE IS CLOSER TO IS CLOSER TO AN OUTSIDE OF THE BATTERY THAN THE SECOND SURFACE — S801

PROVIDE A POLE, WHERE THE POLE IS INSERTED INTO THE FIRST RECESS FROM THE FIRST SURFACE OF THE COVER PLATE, THE POLE ABUTS AGAINST THE CARRIER PORTION, AND THE POLE IS CONFIGURED TO BE ELECTRICALLY CONNECTED WITH A CURRENT COLLECTOR OF THE BATTERY, AND THE POLE DEFINES A SECOND THROUGH HOLE, THE POLE INCLUDES AN ABUTTING PORTION AND A POLE BODY CONNECTED WITH THE EACH OTHER, THE ABUTTING PORTION IS DISPOSED IN THE FIRST RECESS AND ABUTS AGAINST THE CARRIER PORTION, THE POLE BODY EXCEEDS THE FIRST SURFACE, AND THE SECOND THROUGH HOLE PENETRATES THROUGH THE ABUTTING PORTION AND THE POLE BODY, WHERE THE SECOND THROUGH HOLE INCLUDES A FIRST THROUGH SUB-HOLE AND A SECOND THROUGH SUB-HOLE THAT ARE BENT AND COMMUNICATE WITH EACH OTHER, THE FIRST THROUGH SUB-HOLE PENETRATES THROUGH A SURFACE OF THE ABUTTING PORTION AWAY FROM THE POLE BODY, AND THE SECOND THROUGH SUB-HOLE PENETRATES THROUGH A SURFACE OF THE POLE BODY CONNECTED WITH THE ABUTTING PORTION — S802

PROVIDE AN EXPLOSION-PROOF ASSEMBLY, WHERE THE EXPLOSION-PROOF ASSEMBLY INCLUDES AN EXPLOSION-PROOF VALVE AND A PROTECTIVE SHEET, THE EXPLOSION-PROOF VALVE AND THE PROTECTIVE SHEET ARE DISPOSED IN THE SECOND THROUGH HOLE, THE EXPLOSION-PROOF VALVE IS SPACED APART FROM THE PROTECTIVE SHEET, THE EXPLOSION-PROOF VALVE IS DISPOSED IN THE FIRST THROUGH SUB-HOLE, THE PROTECTIVE SHEET IS DISPOSED IN THE SECOND THROUGH SUB-HOLE, THE EXPLOSION-PROOF VALVE IS CLOSER TO THE SECOND SURFACE THAN THE PROTECTIVE SHEET, AND THE EXPLOSION-PROOF VALVE IS CONFIGURED TO SEAL THE SECOND THROUGH HOLE — S803

PROVIDE AN ELECTRICAL CONNECTOR AND A BATTERY BODY, WHERE THE BATTERY BODY INCLUDES THE CURRENT COLLECTOR — S804

CONNECT THE ELECTRICAL CONNECTOR WITH THE POLE AND THE CURRENT COLLECTOR ELECTRICALLY RESPECTIVELY, WHERE THE ELECTRICAL CONNECTOR IS INSERTED INTO THE FIRST THROUGH HOLE — S805

FIG. 17

COVER PLATE ASSEMBLY, BATTERY, AND METHOD FOR ASSEMBLING BATTERY

CROSS-REFERENCE TO RELATED APPLICATIONS

This application claims priority under 35 U.S.C. § 119(a) to and the benefit of Chinese Patent Application No. 202211417886.0, filed Nov. 14, 2022, the entire disclosure of which is incorporated herein by reference.

TECHNICAL FIELD

This disclosure relates to the field of power battery technology, and in particular to a cover plate assembly, a battery, and a method for assembling a battery.

BACKGROUND

Nowadays, more and more devices choose batteries as energy sources, such as electric bicycles, electric motorcycles, electric vehicles, etc. More attention has been paid to structural stability, power supply stability, and safety of the batteries. A battery includes a cover plate assembly. A pole of the cover plate assembly penetrates through a through hole of a cover plate and is fixed by an injection process. However, when the cover plate assembly is applied to the battery, due to lack of support at an end of the pole close to the inside of the battery, the pole is prone to displacement when the pole is subjected to an external pressure, thereby resulting in dislocation and disconnection of a current collector of the battery, such that an electrical connection is unable to be kept, and the battery is unable to continue supplying power.

SUMMARY

In a first aspect, a cover plate assembly is provided in the present disclosure. The cover plate assembly is applied to a battery, and includes a cover plate, a pole, and an explosion-proof assembly. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. The pole is disposed in the first recess. The pole abuts against the carrier portion. The pole is configured to be electrically connected with a current collector of the battery. The pole defines a second through hole. The pole includes an abutting portion and a pole body connected with each other. The abutting portion is disposed in the first recess and abuts against the carrier portion. The pole body exceeds the first surface. The second through hole penetrates through the abutting portion and the pole body. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed closer to the second surface than the protective sheet. The explosion-proof valve is configured to seal the second through hole. The second through hole includes a first through sub-hole and a second through sub-hole that intersect and communicate with each other. The first through sub-hole penetrates through a surface of the abutting portion away from the pole body. The explosion-proof valve is disposed in the first through sub-hole. The second through sub-hole penetrates through a surface of the pole body connected with the abutting portion. The protective sheet is disposed in the second through sub-hole.

In a second aspect, a battery is provided in the present disclosure. The battery includes a battery body and a cover plate assembly. The cover plate assembly is configured to seal the battery body and configured to be electrically connected with an electricity-consumption device. The cover plate assembly includes a cover plate, a pole, and an explosion-proof assembly. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. The pole is disposed in the first recess. The pole abuts against the carrier portion. The pole is configured to be electrically connected with a current collector of the battery. The pole defines a second through hole. The pole includes an abutting portion and a pole body connected with each other. The abutting portion is disposed in the first recess and abuts against the carrier portion. The pole body exceeds the first surface. The second through hole penetrates through the abutting portion and the pole body. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed closer to the second surface than the protective sheet. The explosion-proof valve is configured to seal the second through hole. The second through hole includes a first through sub-hole and a second through sub-hole that intersect and communicate with each other. The first through sub-hole penetrates through a surface of the abutting portion away from the pole body. The explosion-proof valve is disposed in the first through sub-hole. The second through sub-hole penetrates through a surface of the pole body connected with the abutting portion. The protective sheet is disposed in the second through sub-hole.

In a third aspect, a method for assembling a battery is provided in the present disclosure. The assembling method includes the following. A cover plate is provided. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. A pole is provided. The pole is inserted into the first recess from the first surface of the cover plate. The pole abuts against the carrier portion. The pole is configured to be electrically connected with a current collector of the battery. The pole defines a second through hole. The pole includes an abutting portion and a pole body connected with each other. The abutting portion is disposed in the first recess and abuts against the carrier portion. The pole body exceeds the first surface. The second through hole penetrates through the abutting portion and the pole body. The second through hole includes a first through sub-hole and a second through sub-hole that intersect and communicate with each other. The first through sub-hole penetrates through a surface of the abutting portion away from the pole body. The second through sub-hole penetrates through a surface of the pole body connected with the abutting portion. An explosion-proof assembly is provided. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed in the first through sub-hole. The protective sheet is disposed in the second through sub-hole. The explosion-proof valve is disposed closer to the second surface than the protective sheet. The explosion-proof valve is configured to seal the second through hole.

BRIEF DESCRIPTION OF THE DRAWINGS

In order to explain technical solutions in implementations of the present disclosure more clearly, the following will give a brief introduction to the accompanying drawings required for describing implementations. Apparently, the accompanying drawings in the following description illustrate some implementations of the present disclosure. For those of ordinary skill in the art, other accompanying drawings can be obtained according to these accompanying drawings without creative efforts.

FIG. 16 is a flowchart of a method for assembling a battery in an implementation of the present disclosure.

FIG. 17 is a flowchart of a method for assembling a battery in another implementation of the present disclosure.

Figure 1:
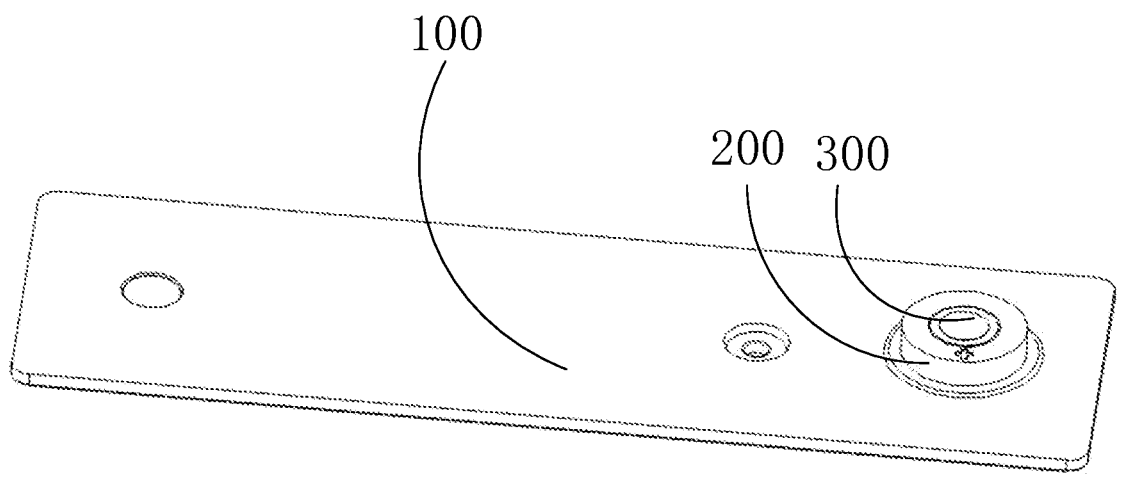
FIG. 1 is a schematic structural view of a cover plate assembly in an implementation of the present disclosure.

REFERENCE SIGNS 1-cover plate assembly, 100-cover plate, 110-cover plate body, 111-first surface, 112-second surface, 120-carrier portion, 121-first through hole, 130-first recess, 200-pole, 201a-first hole, 201b-second hole, 202a-third hole, 202b-fourth hole, 210-second through hole, 211-first through sub-hole, 212-second through sub-hole, 220-abutting option, 221-second recess, 230-pole body, 240-first end surface, 250-second end surface, 300-explosion-proof assembly, 310-explosion-proof valve, 320-protective sheet, 4-battery, 410-battery body, 413-positive-electrode cover plate, 414-negative-electrode cover plate, 415-electrical connector, 416-current collector, 5-battery pack, 501-box, 6-electricity-consumption device, 610-electricity-consumption device body, 611-device positive electrode, 612-device negative electrode.

DETAILED DESCRIPTION

The following will clearly and completely describe technical solutions of implementations of the present disclosure with reference to the accompanying drawings. Apparently, implementations described herein are merely some implementations, rather than all implementations. Based on the implementations of the present disclosure, all other implementations obtained by those of ordinary skill in the art without creative effort shall fall within the protection scope of the present disclosure.

The terms such as "first", "second", etc., in the specification, the claims, and the above accompanying drawings of the present disclosure are used to distinguish different objects, rather than describing a particular order. In addition, the terms "including", "comprising", and "having" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with implementations may be defined in at least one implementation of the present disclosure. The phrase "implementation" appearing in various places in the specification does not necessarily refer to the same implementation or an independent/alternative implementation that is mutually exclusive with other implementations. Those of ordinary skill in the art will understand expressly and implicitly that an implementation described herein may be combined with other implementations.

In view of this, a cover plate assembly, a battery, a method for assembling a battery, a battery pack, and an electricity-consumption device are provided in the present disclosure. When the cover plate assembly in the present disclosure is applied to the battery, a pole abuts against a cover plate on a surface of the cover plate facing an outside of the battery. When the pole is subjected to an external pressure, the cover plate can support the pole well, such that the cover plate assembly has good stability.

In a first aspect, a cover plate assembly is provided in the present disclosure. The cover plate assembly is applied to a battery, and includes a cover plate, a pole, and an explosion-proof assembly. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. The pole is disposed in the first recess. The pole abuts against the carrier portion. The pole is configured to be electrically connected with a current collector of the battery. The pole defines a second through hole. The pole includes an abutting portion and a pole body connected with each other. The abutting portion is disposed in the first recess and abuts against the carrier portion. The pole body exceeds the first surface. The second through hole penetrates through the abutting portion and the pole body. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed closer to the second surface than the protective sheet. The explosion-proof valve is configured to seal the second through hole. The second through hole includes a first through sub-hole and a second through sub-hole that intersect and communicate with each other. The first through sub-hole penetrates through a surface of the abutting portion away from the pole body. The explosion-proof valve is disposed in the first through sub-hole. The second through sub-hole penetrates through a surface of the pole body connected with the abutting portion. The protective sheet is disposed in the second through sub-hole.

The cover plate in the present disclosure defines the first recess that is defined cooperatively by the carrier portion and the cover plate body, and the pole is disposed in the first recess. When the pole is subjected to an external pressure, the pole in the first recess can be supported by the carrier portion and the cover plate body, such that the pole has a stable structure and the cover plate assembly has good structural stability. In addition, the pole in the present disclosure defines the second through hole, so as to avoid the cover plate from defining a through hole, and when the battery has an excessively internal pressure, a pressure is directly released through the second through hole of the pole. The second through hole cooperates with the explosion-proof valve, such that the battery has a sealed and stable environment during normal operation, and when the battery is abnormal and the internal pressure of the battery rises, the explosion-proof valve is broken, and the pressure is relived through the second through hole, so as to prevent the battery from exploding and ensure safety of the battery. The protective sheet is configured to protect the explosion-proof valve, so as to prevent the explosion-proof valve from being damaged by a sharp and protruding object outside. The cover plate provided in the present disclosure has good structural stability.

In implementations, the second through hole penetrates through a surface of the pole body away from the abutting portion.

The abutting portion in the present disclosure is disposed in the first recess. When the pole body is subjected to an external pressure, the abutting portion in the first recess can be supported by the carrier portion and the cover plate body, so as to stabilize a position of the pole body. The pole body exceeds the first surface, which can increase an effective area of electrical connection between the pole body and an external component, and facilitates an electrical connection between the pole body and the external component by clamping, welding, and the like.

When the cover plate assembly is applied to the battery, the first through sub-hole communicates with the first through hole, and the second through sub-hole communicates with the outside of the battery. When an accident occurs to the battery due to improper charging or short circuit, a gas inside the battery will break through the explosion-proof valve, rush out through the first through hole, enter the second through sub-hole through the first through sub-hole, and then be discharged outside the battery through the second through sub-hole, thereby completing pressure relief. The second through sub-hole penetrates through a peripheral side surface of the pole body, such that a second end surface of the pole can be kept intact, and the battery to which the cover plate assembly in the present disclosure is applied can be electrically connected with the external component more conveniently.

In implementations, the abutting portion exceeds the pole body in a direction perpendicular to an arrangement direction of the abutting portion and the pole body.

When the cover plate assembly is applied to the battery, the abutting portion is disposed in the first recess. When the pole is subjected to the external pressure, the pole in the first recess can be supported by the carrier portion and the cover plate body. Compared with the abutting portion having a radial size equal to the pole body, when the abutting portion has the radial size larger than the pole body, the torque causing the pole to rotate is increased, such that the pole is more strongly supported and the stability of the cover plate assembly is further improved.

In implementations, the abutting portion has a first end surface away from the pole body. The abutting portion further defines a second recess penetrating through the first end surface. The second recess communicates with the first through sub-hole. The second recess has a radial size larger than the first through sub-hole. The explosion-proof valve is disposed in the second recess and abuts against the second recess at a bottom wall of the second recess.

The explosion-proof valve is configured to cover the first through sub-hole to seal the second through hole, and the explosion-proof valve cooperates with the first end surface to seal the first through hole, such that the sealed and stable environment inside the battery is ensured. In addition, when the battery is abnormal and the battery has an excessively internal pressure, the explosion-proof valve is broken to release the internal pressure of the battery.

In a second aspect, a battery is provided in the present disclosure. The battery includes a battery body and a cover plate assembly. The cover plate assembly is configured to seal the battery body and configured to be electrically connected with an electricity-consumption device. The cover plate assembly includes a cover plate, a pole, and an explosion-proof assembly. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. The pole is disposed in the first recess. The pole abuts against the carrier portion. The pole is configured to be electrically connected with a current collector of the battery. The pole defines a second through hole. The pole includes an abutting portion and a pole body connected with each other. The abutting portion is disposed in the first recess and abuts against the carrier portion. The pole body exceeds the first surface. The second through hole penetrates through the abutting portion and the pole body. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed closer to the second surface than the protective sheet. The explosion-proof valve is configured to seal the second through hole. The second through hole includes a first through sub-hole and a second through sub-hole that intersect and communicate with each other. The first through sub-hole penetrates through a surface of the abutting portion away from the pole body. The explosion-proof valve is disposed in the first through sub-hole. The second through sub-hole penetrates through a surface of the pole body connected with the abutting portion. The protective sheet is disposed in the second through sub-hole.

The battery body in the present disclosure is equipped with the cover plate assembly in the present disclosure. The cover plate assembly in the present disclosure has a simple manufacturing process, reduced costs, and good structural stability, such that manufacturing costs of the battery in the present disclosure can be reduced to a certain extent, and the battery in the present disclosure has good structural stability and power supply stability.

In a third aspect, a method for assembling a battery is provided in the present disclosure. The assembling method includes the following. A cover plate is provided. The cover plate includes a cover plate body and a carrier portion connected with each other. The cover plate body has a first surface and a second surface opposite to each other. The cover plate body is disposed around an external periphery of the carrier portion. The carrier portion is recessed from the first surface. The carrier portion and the cover plate body cooperatively define a first recess. The carrier portion defines a first through hole communicating with the first recess. When the cover plate assembly is applied to the battery, the first surface is closer to an outside of the battery than the second surface. A pole is provided. The pole is inserted into the first recess from the first surface of the cover plate. The pole abuts against the carrier portion. The pole is configured to be electrically connected with a current collector of the battery. The pole defines a second through hole. The pole includes an abutting portion and a pole body connected with the abutting portion. The abutting portion is disposed in the first recess and abuts against the carrier portion. The pole body exceeds the first surface. The second through hole penetrates through the abutting portion and the pole body. The second through hole includes a first through sub-hole and a second through sub-hole that intersect and communicate with each other. The first through sub-hole penetrates through a surface of the abutting portion away from the pole body. The second through sub-hole penetrates through a surface of the pole body connected with the abutting portion. An explosion-proof assembly is provided. The explosion-proof assembly includes an explosion-proof valve and a protective sheet. The explosion-proof valve and the protective sheet are disposed in the second through hole. The explosion-proof valve is spaced apart from the protective sheet. The explosion-proof valve is disposed in the first through sub-hole. The protective sheet is disposed in the second through sub-hole. The explosion-proof valve is disposed closer to the second surface than the protective sheet. The explosion-proof valve is configured to seal the second through hole.

In the battery assembled by the assembling method provided in the present disclosure, the pole penetrates through the first recess from the first surface of the cover plate and abuts against the carrier portion. An external force to which the pole of the battery is subjected usually comes from external extrusion. The pole abuts against the cover plate on a surface of the cover plate facing the outside of the battery. When the pole is extruded by the external force, the cover plate strongly supports the pole. In addition, the pole is disposed in the first recess of the cover plate, and since the first recess is defined cooperatively by the carrier portion and the cover plate body, the pole in the first recess can also be supported by the cover plate body when the pole is subjected to external pressures in other directions. In the battery assembled by the assembling method provided in the present disclosure, when a force to which the pole is subjected can be resolved into two component forces, where one is perpendicular to an extension direction of the cover plate and the other is parallel to the extension direction of the cover plate, the carrier portion can provide support for the component force perpendicular to the extension direction of the cover plate, and the cover plate body can provide support for the component force parallel to the extension direction of the cover plate, such that the pole and the cover plate assembly have good structural stability. The cover plate assembly provided in the present disclosure further includes the explosion-proof assembly. When the battery is in normal operation, the explosion-proof valve makes the inside of the battery in the sealed and stable environment. When the battery is abnormal and the internal pressure of the battery rises, the explosion-proof valve is broken and the second through hole is no longer sealed, and the second through hole communicates the inside of the battery with the outside of the battery, such that the internal pressure of the battery is released. The protective sheet is disposed farther away from the second surface than the explosion-proof valve, and is configured to protect the explosion-proof valve to prevent the explosion-proof valve from being damaged by the sharp and protruding object outside. Specifically, when an accident occurs to the battery due to improper charging or short circuit, an internal temperature of the battery will rise sharply and a large amount of gas will be generated. Here, the gas inside the battery will break through the explosion-proof valve, and then rush out through the first through hole to be discharged to the outside of the battery through the second through hole, thereby completing pressure relief, preventing the battery from exploding, and ensuring the safety of the battery.

In implementations, the method for assembling the battery in the present disclosure further includes the following. An electrical connector and a battery body are provided. The battery body includes a current collector. The electrical connector is electrically connected with the pole and the current collector respectively. The electrical connector is inserted into the first through hole.

In the battery assembled by the assembling method provided in the present disclosure, the battery includes the electrical connector and the current collector. The electrical connector is electrically connected with the pole and the current collector respectively, and the electrical connector is inserted into the first through hole. The current collector is configured to collect a current generated by the battery. The current is supplied to the pole through the electrical connector. The pole is configured to be electrically connected with an external electricity-consumption device and supply power. In the battery assembled by the assembling method provided in the present disclosure, when the force to which the pole is subjected can be resolved into two component forces, where one is perpendicular to the extension direction of the cover plate and the other is parallel to the extension direction of the cover plate, the carrier portion can provide support for the component force perpendicular to the extension direction of the cover plate, and the cover plate body can provide support for the component force parallel to the extension direction of the cover plate, such that the pole and the cover plate assembly have good structural stability.

In a fourth aspect, a battery pack is provided in the present disclosure. The battery pack includes a box and multiple batteries in the present disclosure. The multiple batteries are accommodated in the box. The multiple batteries are connected in series and/or in parallel.

The battery in the present disclosure has low manufacturing costs and good structural stability, such that the battery pack in the present disclosure also has good structural stability and power supply stability.

In a fifth aspect, an electricity-consumption device is provided in the present disclosure. The electricity-consumption device includes an electricity-consumption device body and the battery in the present disclosure. The electricity-consumption device body includes a device positive electrode and a device negative electrode. The battery is electrically connected with the device positive electrode and the device negative electrode. The battery is configured to supply power to the electricity-consumption device body.

When the battery is used as the power supply of an electric vehicle, due to high stability and high safety of the battery, power supply stability and safety of the electric vehicle can still be ensured in case of collision and friction of the electric vehicle.

The cover plate in the present disclosure defines the first recess that is defined cooperatively by the carrier portion and the cover plate body, and the pole is disposed in the first recess. When the pole is subjected to the external pressure, the pole in the first recess can be supported by the carrier portion and the cover plate body, such that the pole has stable structure and the cover plate assembly has good structural stability. In addition, the pole in the present disclosure defines the second through hole, so as to avoid the cover plate from defining the through hole, and when the battery has the excessively internal pressure, the pressure is directly released through the second through hole of the pole. The second through hole cooperates with the explosion-proof valve, such that the battery has the sealed and stable environment during normal operation, and when the battery is abnormal and the internal pressure of the battery rises, the explosion-proof valve is broken, and the pressure is released through the second through hole, so as to prevent the battery from exploding and ensure the safety of the battery. The protective sheet is configured to protect the explosion-proof valve, so as to prevent the explosion-proof valve from being damaged by the sharp and protruding object. The cover plate provided in the present disclosure has good structural stability.

In the related art, a lithium battery include an explosion-proof valve, a protective sheet, a pole, a sealing ring, a lower plastic member, an upper plastic member, a cover plate, etc. When the lithium battery is assembled, the sealing ring is sleeved on the pole first, and then the pole penetrates through a through hole of the lower plastic member and a through hole of the cover plate in sequence. Subsequently, an injection molding process for the upper plastic member is performed, and shaping is completed after cooling. When the explosion-proof valve is assembled, the cover plate is punched to define a through hole first, the explosion-proof valve is welded to a surface of the cover plate facing the inside of the battery, the explosion-proof valve seals an opening of the through hole, the protective sheet is welded to a surface of the cover plate facing the outside of the battery, and the protective sheet seals the other opening of the through hole. Therefore, the pole and the explosion-proof valve each are disposed and fixed. As for the pole fixed by this process, when the battery is subjected to an external pressure, the pole is pressed toward the inside of the battery. A side wall of the pole is connected with the upper plastic member and the lower plastic member. When the pole is subjected to a force directed toward the inside of the battery, a bonding force between the upper plastic member and the side wall of the pole and a bonding force between the lower plastic member and the side wall of the pole are unable to provide effective support for the pole, thereby resulting in insufficient structural stability of the battery. A method for assembling the explosion-proof valve requires a punching process for the cover plate, which makes the process complicated.

In view of this, reference can be made to FIG. 1, FIG. 2, FIG. 4, FIG. 7, FIG. 8, and FIG. 13. The cover plate assembly 1 is provided in implementations and is applied to a battery 4. The cover plate assembly 1 includes a cover plate 100, a pole 200, and an explosion-proof assembly 300. The cover plate 100 includes a cover plate body 110 and a carrier portion 120 connected with each other. The cover plate body 110 has a first surface 111 and a second surface 112 opposite to each other. The cover plate body 110 is disposed around an external periphery of the carrier portion 120. The carrier portion 120 is recessed from the first surface 111. The carrier portion 120 and the cover plate portion 110 cooperatively define a first recess 130. The carrier portion 120 defines a first through hole 121 communicating with the first recess 130. When the cover plate assembly 1 is applied to the battery, the first surface 111 is closer to the outside of the battery than the second surface 112. The pole 200 is disposed in the first recess 130. The pole 200 abuts against the carrier portion 120. The pole 200 is configured to be electrically connected with a current collector of the battery. The pole 200 defines a second through hole 210. The explosion-proof assembly 300 includes an explosion-proof valve 310 and a protective sheet 320. The explosion-proof valve 310 and the protective sheet 320 are disposed in the second through hole 210. The explosion-proof valve 310 is spaced apart from the protective sheet 320. The explosion-proof valve 310 is disposed closer to the second surface 112 than the protective sheet 320. The explosion-proof valve 310 is configured to seal the second through hole 210.

In the cover plate assembly 1 provided in implementations of the present disclosure, the pole 200 is disposed in the first recess 130 of the cover plate 100 and abuts against the carrier portion 120 of the cover plate 100. When the cover plate assembly 1 is applied to the battery 4, the main external pressure to which the battery 4 is subjected presses the pole 200 toward the inside of the battery 4. Here, the pole 200 in the present disclosure will be strongly supported by the carrier portion 120 of the cover plate 100. Specifically, a direction of the external pressure to which the battery 4 is subjected is from the pole 200 to the inside of the battery 4, and since the carrier portion 120 abuts against the pole 200, the carrier portion 120 will provide the pole 200 with a reacting force in a direction from the carrier portion 120 to the pole 200, and the external pressure and the reacting force are equal in magnitude and opposite in direction, such that the pole 200 can be strongly supported by the cover plate 100. In addition, the pole 200 is disposed in the first recess 130 of the cover plate 100, and since the first recess 130 is defined cooperatively by the carrier portion 120 and the cover plate body 110, the pole 200 in the first recess 130 can also be supported by the cover plate body 110 when the pole 200 is subjected to external pressures in other directions. In other words, when a force applied to the pole 200 can be resolved into two component forces, where one is perpendicular to an extension direction of the cover plate 100 and the other is parallel to the extension direction of the cover plate 100, the carrier portion 120 can provide support for the component force perpendicular to the extension direction of the cover plate 100, and the cover plate body 110 can provide support for the component force parallel to the extension direction of the cover plate 100, such that the pole 200 and the cover plate assembly 1 have good structural stability. The cover plate assembly 1 provided in the present disclosure further includes the explosion-proof assembly 300. When the battery 4 is in normal operation, the explosion-proof valve 310 makes the inside of the battery 4 in a sealed and stable environment. When the battery 4 is abnormal and an internal pressure of the battery 4 rises, the explosion-proof valve 310 is broken and the second through hole 210 is no longer sealed, and the second through hole 210 communicates the inside of the battery 4 with the outside of the battery 4, such that the internal pressure of the battery 4 is released. The protective sheet 320 is disposed farther away from the second surface 112 than the explosion-proof valve 310, and is configured to protect the explosion-proof valve 310 from being damaged by a sharp and protruding object outside. Specifically, when an accident occurs to the battery 4 due to improper charging or short circuit, an internal temperature of the battery 4 will rise sharply and a large amount of gas will be generated. Here, the gas inside the battery 4 will break through the explosion-proof valve 310, and then rush out through the first through hole 121 to be discharged to the outside of the battery 4 through the second through hole 210, thereby completing pressure relief, preventing the battery 4 from exploding, and ensuring the safety of the battery 4.

Optionally, the cover plate body 110 and the carrier portion 120 are connected and form an integrated structure.

Optionally, the first surface 111 is closer to the outside of the battery than a surface of the cover plate body 110 away from the first surface 111. In other words, when the cover plate assembly 1 is applied to the battery 4, the first surface 111 is an external surface of the battery.

Optionally, the cover plate 100 is a polished aluminum sheet.

It can be understood that the first surface 111 is closer to the outside of the battery than the second surface 112 as follows. When the cover plate assembly 1 is applied to the battery 4, the first surface 111 faces the outside of the battery 4 and the second surface 112 faces the inside of the battery 4.

Figure 2:
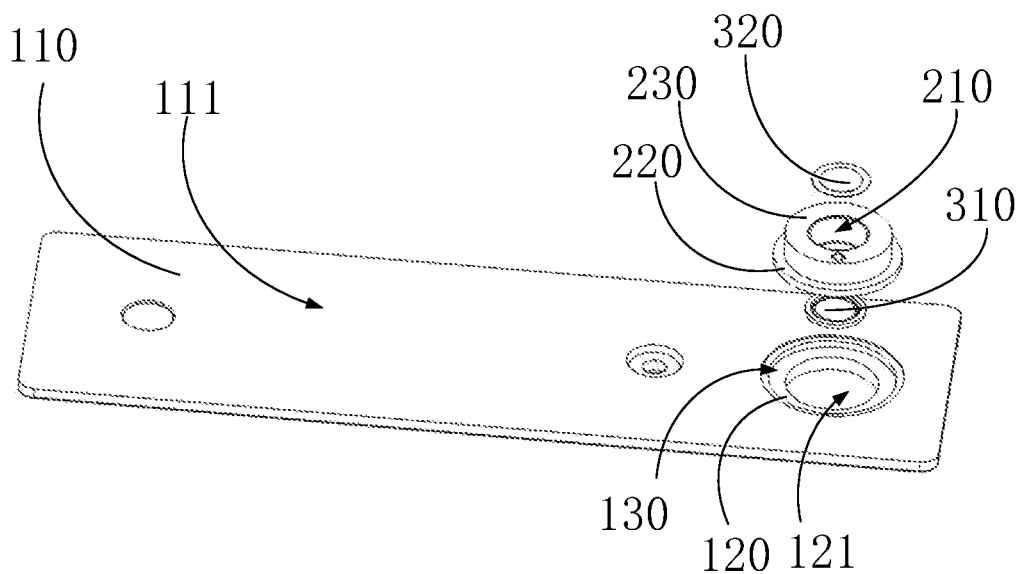
FIG. 2 is an exploded schematic view of a cover plate assembly in an implementation of the present disclosure.
Figure 3:
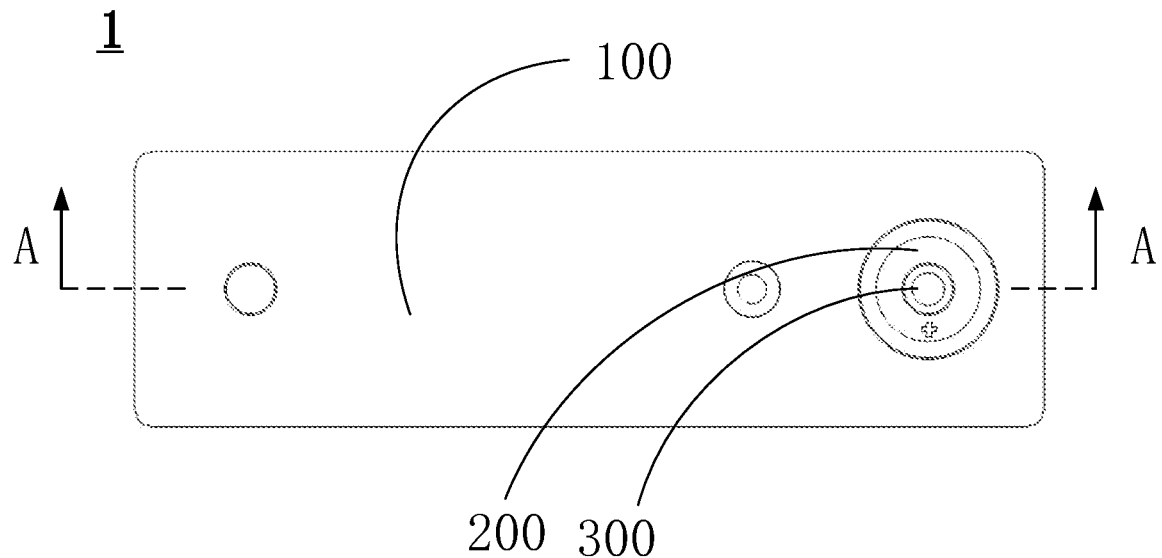
FIG. 3 is a top view of FIG. 1.
Figure 4:
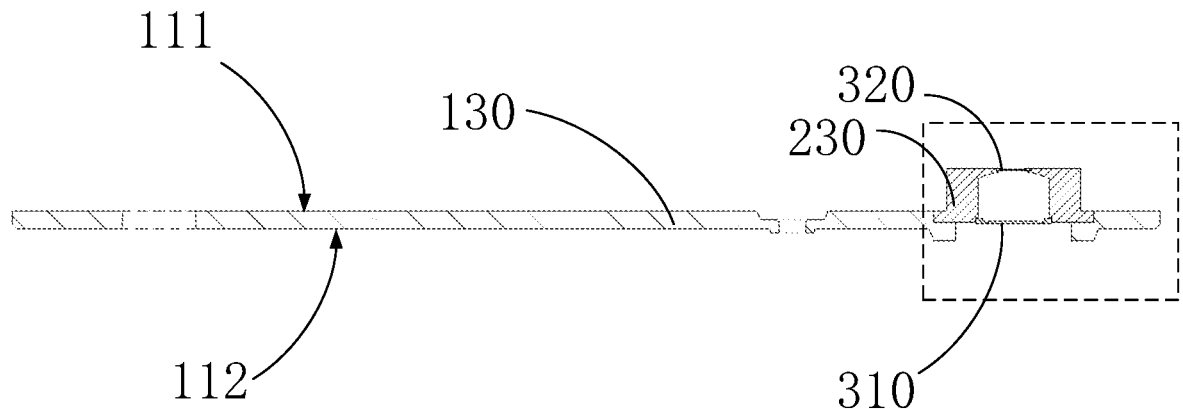
FIG. 4 is a cross-sectional view taken in direction A-A in FIG. 3.
Figure 7:
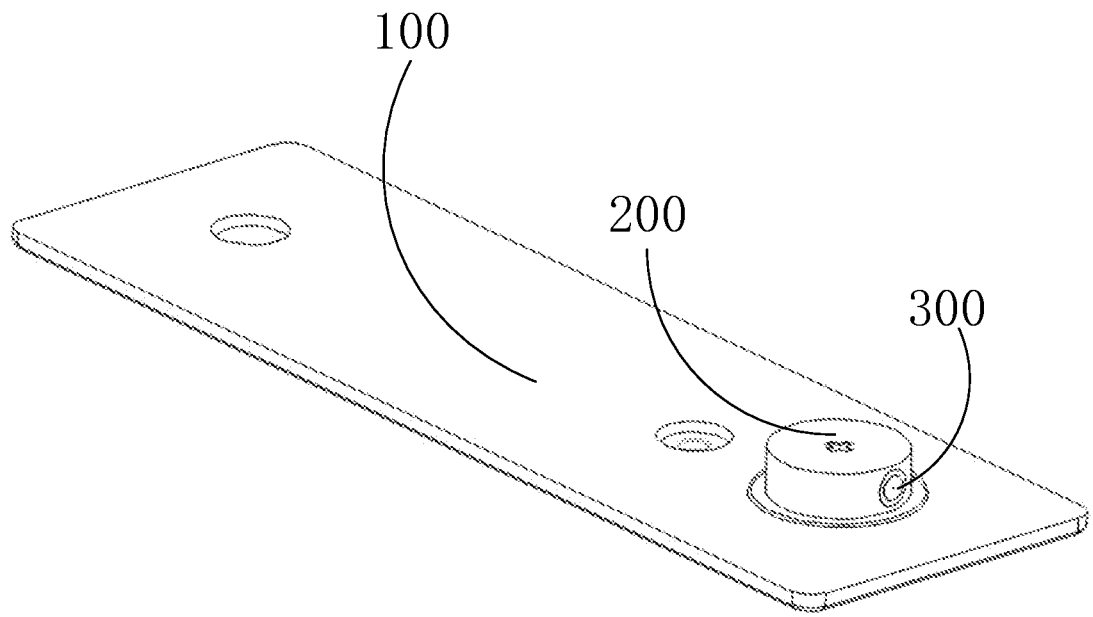
FIG. 7 is a schematic structural view of a cover plate assembly in another implementation in the present disclosure.
Figure 8:
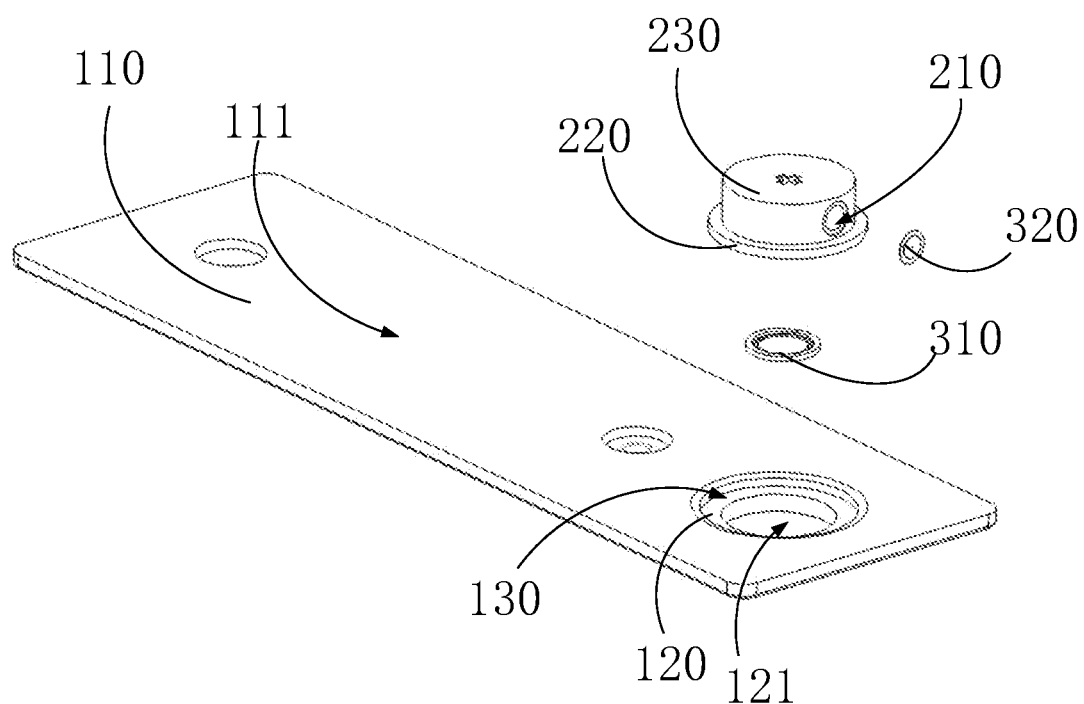
FIG. 8 is an exploded schematic view of a cover plate assembly in another implementation of the present disclosure.
Figure 9:
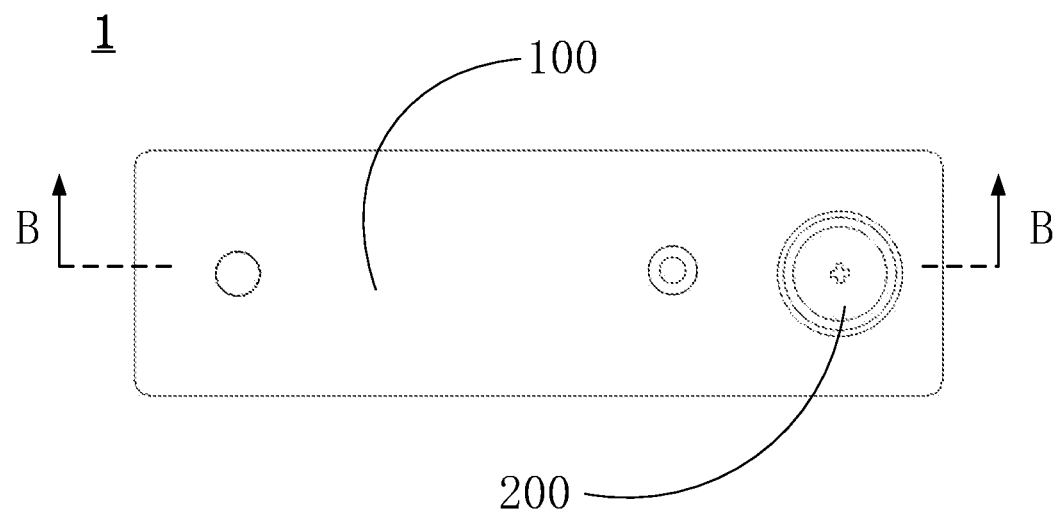
FIG. 9 is a top view of FIG. 7.
Figure 10:
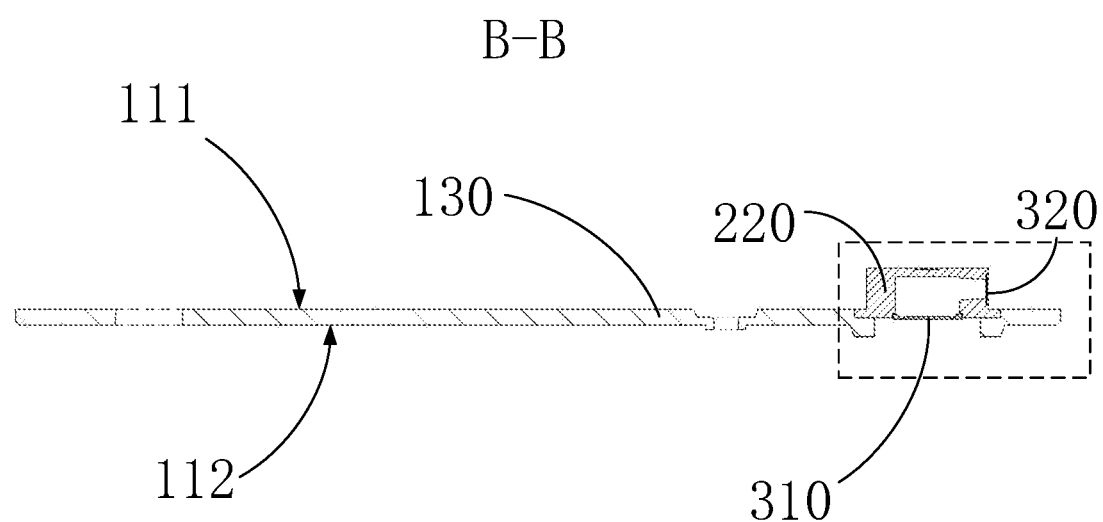
FIG. 10 is a cross-sectional view taken in direction B-B in FIG. 9.

Reference can be made to FIG. 2 and FIG. 7. In a possible implementation, the pole 200 includes an abutting portion 220 and a pole body 230 connected with the abutting portion 220. The abutting portion 220 is disposed in the first recess 130 and abuts against the carrier portion 120. The pole body 230 exceeds the first surface 111. The second through hole 210 penetrates through the abutting portion 230 and the pole body 230. The second through hole 210 penetrates through a surface of the pole body 230 away from the abutting portion 220.

Optionally, the pole 200 has a first end surface 240 and a second end surface 250 opposite to each other. The first end surface 240 is a surface of the abutting portion 220 away from the pole body 230, and the second end surface 250 is the surface of the pole body 230 away from the abutting portion 220. The second through hole 210 penetrates through the abutting portion 220 and the pole body 230. Optionally, the second through hole 210 penetrates through the first end surface 240 and the second end surface 250 respectively.

Optionally, the abutting portion 220 is connected with the pole body 230, and the second through hole 210 penetrates through the abutting portion 220 and the pole body 230 respectively. The abutting portion 220 is disposed in the first recess 130 and abuts against the carrier portion 120. When the cover plate assembly 1 is applied to the battery 4, a direction of the external pressure to which the battery 4 is subjected is from the pole 200 to the inside of the battery 4, that is, the direction of the external pressure to which the battery 4 is subjected is from the pole body 230 to the abutting portion 220, the carrier portion 120 abuts against the abutting portion 220, and the carrier portion 120 will provide the abutting portion 220 with a reacting force in a direction from the carrier portion to the abutting portion 220, such that the abutting portion 220 is strongly supported by the cover plate 100, thereby ensuring stability of the pole body 230 and the pole 200. In addition, the abutting portion 220 is disposed in the first recess 130, and the first recess 130 is defined cooperatively by the carrier portion 120 and the cover plate body 110, so when the abutting portion 220 in the first recess 130 is subjected to external pressures in other directions, the cover plate body 110 will support the abutting portion 220 that is subjected to the external pressures in other directions. It can be reasonably known that when the force applied to the pole 200 can be resolved into two component forces, where one is perpendicular to the extension direction of the cover plate 100 and the other is parallel to the extension direction of the cover plate 100, the carrier portion 120 can provide support for the component force perpendicular to the extension direction of the cover plate 100, and the cover plate body 110 can provide support for the component force parallel to the extension direction of the cover plate 100, thereby ensuring structural stability of the pole body 230 and the pole 200.

Optionally, the pole body 230 exceeds the first surface 111. In other words, the pole body 230 exceeds the first recess 130. In addition, the second through hole 210 penetrates through the surface of the pole body 230 away from the abutting portion 220. When the cover plate assembly 1 is applied to the battery 4, the second through hole 220 penetrates through the surface of the pole body 230 away from the abutting portion 220. If the pole body 230 does not exceed the first surface 111, that is, the surface of the pole body 230 away from the abutting portion 220 is flush with the first surface 111 or recessed from the first surface 111, an effective area of electrical connection between the pole body 230 and an external component is too small, which will bring great inconvenience to practical application of the battery 4. If the pole body 230 exceeds the first surface 111, a surface of the pole body 230 that is connected with a surface of pole body 230 away from the abutting portion 220 in a bent manner is exposed, such that the battery 4 to which the cover plate assembly 1 of the present disclosure is applied can be convenient to be electrically connected with the external component.

Reference can be made to FIG. 7 to FIG. 12. In a possible implementation, the second through hole 210 includes a first through sub-hole 211 and a second through sub-hole 212 that intersect and communicate with each other. The first through sub-hole 211 penetrates through a surface of the abutting portion 220 away from the pole body 230. The explosion-proof valve 310 is disposed in the first through sub-hole 211. The second through sub-hole 212 penetrates through a surface of the pole body 230 connected with the abutting portion 220. The protective sheet 320 is disposed in the second through sub-hole 212.

Optionally, the pole body 230 further has a peripheral side surface. The pole body 230 is connected with the second end surface 250 in a bent manner through the peripheral side surface. The first through sub-hole 211 penetrates through the first end surface 240. The second through sub-hole 212 penetrates through the peripheral side surface. When the cover plate assembly 1 is applied to the battery 4, the first through sub-hole 211 communicates with the first through hole 121, and the second through sub-hole 212 communicates with the outside of the battery 4. When an accident occurs to the battery 4 due to improper charging or short circuit, the gas inside the battery 4 will break through the explosion-proof valve 310, rush out through the first through hole 121, enter the second through sub-hole 212 through the first through sub-hole 211, and then be discharged to the outside of battery 4 through the second through sub-hole 212, thereby completing pressure relief. The second through sub-hole 212 penetrates through the peripheral side surface, such that the second end surface 250 of the pole 200 can be kept intact, and the battery 4 to which the cover plate assembly 1 in the present disclosure is applied can be electrically connected with the external component more conveniently. Specifically, when the second through sub-hole 212 is defined on the peripheral side surface, the second end surface 250 can be connected with components of the battery 4 such as an aluminum bar, an isolation plate assembly, etc. Here, since the second through sub-hole 212 is defined on the peripheral side surface, the pressure relief of the battery 4 will not be affected by the components of the battery 4 such as an aluminum bar, an isolation plate assembly, etc., after an accident.

Reference can be made to FIG. 3 to FIG. 5, and FIG. 9 to FIG. 11. In a possible implementation, the abutting portion 220 exceeds the pole body 230 in a direction perpendicular to an arrangement direction of the abutting portion 220 and the pole body 230.

Optionally, the abutting portion 220 exceeds the pole body 230 in the direction perpendicular to the arrangement direction of the abutting portion 220 and the pole body 230. In other words, the abutting portion 220 has a radial size larger than the pole body 230. When the cover plate assembly 1 is applied to the battery 4, the abutting portion 220 is disposed in the first recess 130, and the first recess 130 provides support for the external pressure to which the abutting portion 220 is subjected in a direction perpendicular to the direction from the pole 200 to the inside of the battery 4. It can be reasonably known that when the pole 200 is subjected to a pressure in a direction from the pole 200 to the inside of the battery 4 and/or a pressure in a direction perpendicular to the direction from the pole 200 to the inside of the battery 4, the abutting portion 220 exceeds the pole body 230, and the first recess 130 cooperates with the carrier portion 120, so as to increase the torque that causes the pole 200 to rotate in the direction perpendicular to the direction from the pole 200 to the inside of the battery 4, such that the pole 200 can be strongly supported and the stability of the cover plate assembly 1 can be improved.

Optionally, the abutting portion 220 is disposed in the first recess 130, and the abutting portion 220 exceeds the pole body 230. When the abutting portion 220 of the pole 200 is in a sealed connection with the cover plate body 110 by welding, the abutting portion 220 exceeding the pole body 230 is beneficial to sealing after welding.

Figure 5:
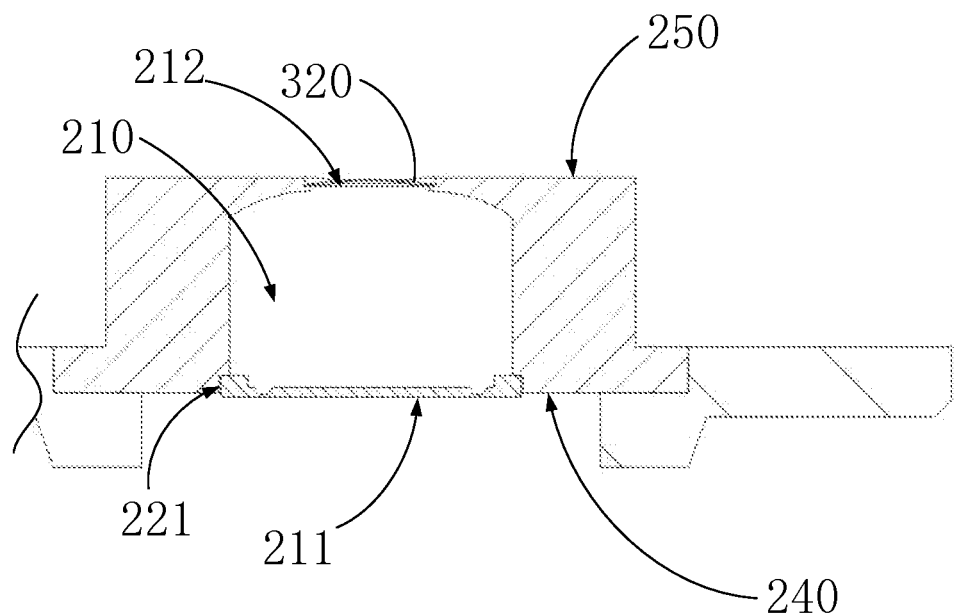
FIG. 5 is a partial enlargement schematic structural view of FIG. 4.
Figure 6:
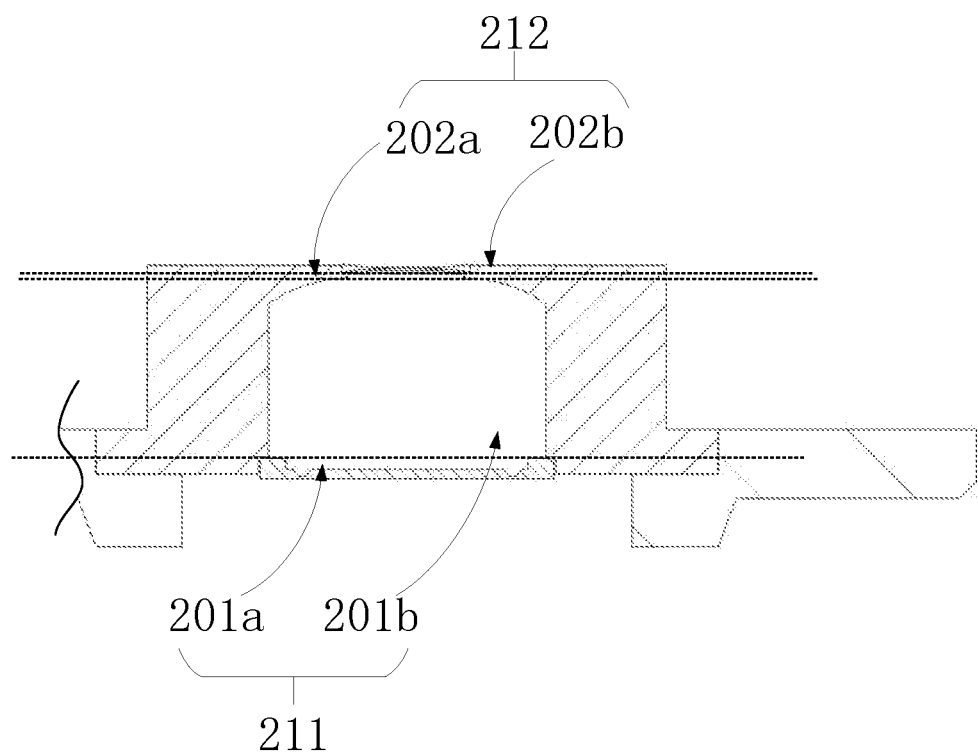
FIG. 6 is a partial enlargement schematic view of hole segment distribution of FIG. 4.
Figure 11:
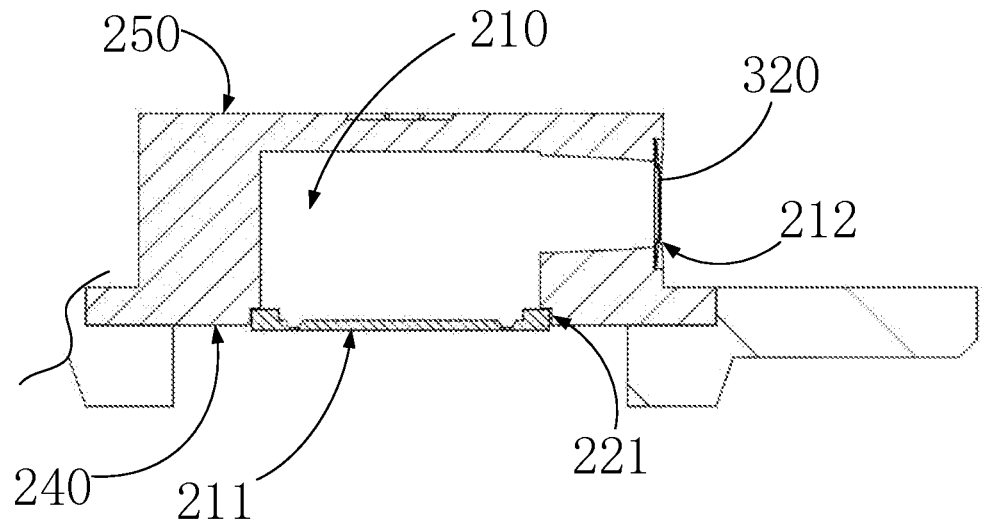
FIG. 11 is a partial enlargement schematic structural view of FIG. 10.
Figure 12:
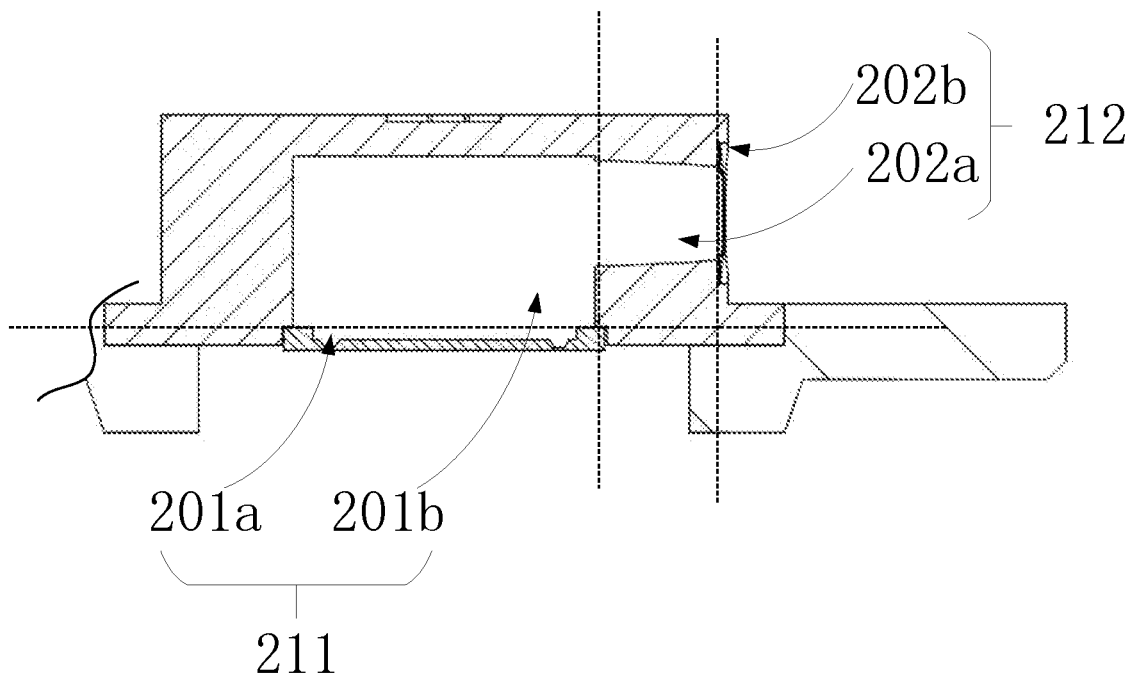
FIG. 12 is a partial enlargement schematic view of hole segment distribution of FIG.

Reference can be made to FIG. 5 and FIG. 11. Optionally, the first through sub-hole 211 is defined on the surface of the abutting portion 220 away from the pole body 230. In other words, the first through sub-hole 211 is defined on a surface of the abutting portion 220 close to the first through hole 121 and communicates with the first through hole 121. Reference can be made to FIG. 5. In an implementation, the second through sub-hole 212 is defined on the surface of the pole body 230 away from the abutting portion 220. When the second through sub-hole 212 is defined on the surface of the pole body 230 away from the abutting portion 220, the pole 200 is easy to be manufactured, and when an accident occurs to the battery 4 and the internal pressure of the battery 4 rises sharply, the pressure relief of the pole 200 is smooth. Reference can be made to FIG. 11. In an implementation, the second through sub-hole 212 is defined on a surface of the pole body 230 where the pole body 230 is in contact with the abutting portion 220. In other words, the second through sub-hole 212 is defined on a side surface of the pole body 230. When the second through sub-hole 212 is defined on the surface of the pole body 230 where the pole body 230 is in contact with the abutting portion 220, the surface of the pole body 230 away from the abutting portion 220 can be connected with components of a battery pack 5. Here, since the second through sub-hole 212 is defined on the side surface of the pole body 230, the pressure relief will not be affected by the components of the battery pack after an accident.

Reference can be made to FIG. 3 to FIG. 5 and FIG. 9 to FIG. 11. In a possible implementation, the abutting portion 220 has a first end surface 240 away from the pole body 230. The abutting portion 220 further defines a second recess 221 penetrating through the first end surface 240. The second recess 221 communicates with the first through sub-hole 211. The second recess 221 has a radial size larger than the first through sub-hole 211. The explosion-proof valve 310 is disposed in the second recess 221 and abuts against the second recess 221 at a bottom wall of the second recess 221.

Optionally, the second recess 221 has the radial size larger than the first through sub-hole 211, such that the explosion-proof valve 310 can be disposed in the second recess 221 and abut against the second recess 221 at the bottom wall of the second recess 221. In addition, it can be reasonably known that the explosion-proof valve 310 covers the first through sub-hole 211, such that the explosion-proof valve 310 seals the inside of the battery 4 to ensure the sealed and stable environment inside the battery 4, and when the internal pressure of the battery 4 rises, the explosion-proof valve 310 is broken to release the internal pressure of the battery 4.

Optionally, an internal side wall of the explosion-proof valve 310 is in a sealed connection with the second recess 221.

Reference can be made to FIG. 1 to FIG. 6 and FIG. 12. In a possible implementation, the second through hole 210 includes a first hole 201*a*, a second hole 201*b*, a third hole 202*a*, and a fourth hole 202*b* that communicate in sequence. The first hole 201*a*, the second hole 201*b*, the third hole 202*a*, and the fourth hole 202*b* are arranged in an arrangement direction of the abutting portion 220 and the pole body 230. The first hole 201*a* has a radial size larger than the second hole 201*b* such that the first hole 201*a* and the second hole 201*b* define a first through sub-hole 211. The explosion-proof valve 310 is disposed in the first through sub-hole 211. The fourth hole 202*b* has a radial size larger than the third hole 202*a* such that the third hole 202*a* and the fourth hole 202*b* define a second through sub-hole 212. The protective sheet 320 is disposed in the second through sub-hole 212.

Optionally, the first hole 201*a* has the radial size larger than the second hole 201*b*, such that the first hole 201*a* and the second hole 201*b* define the first through sub-hole 211, and the explosion-proof valve 310 is disposed in the first through sub-hole 211. Specifically, the explosion-proof valve 310 seals the first through sub-hole 211, such that the explosion-proof valve 310 seals the inside of the battery 4, the sealed and stable environment inside the battery 4 is ensured, and when the internal pressure of the battery 4 rises, the explosion-proof valve 310 is broken to release the internal pressure of the battery 4. Optionally, the fourth hole 202*b* has the radial size larger than the third hole 202*a*, such that the fourth hole 202*b* and the third hole 202*a* define the second through sub-hole 212. Specifically, the protective sheet 320 is fixed in the second through sub-hole 212, such that the protective sheet 320 protects the explosion-proof valve 310 to prevent the explosion-proof valve 310 from being damaged by the sharp and protruding object outside.

Reference can be made to FIG. 3 to FIG. 5, FIG. 10, and FIG. 11. In a possible implementation, the explosion-proof valve 310 defines a nick on a surface of the explosion-proof valve 310 facing the protective sheet 320.

Optionally, the nick of the explosion-proof valve 310 is defined on the surface of the explosion-proof valve 310 facing the protective sheet 320. When the battery 4 is abnormal and the internal pressure of the battery 4 rises to exceed a force limit at the nick of the explosion-proof valve 310, the explosion-proof valve 310 is ruptured at the nick in a direction toward the protective sheet 320, such that the inside of the battery 4 communicates with the outside of the battery 4, and the internal pressure of the battery 4 is released at a rupture, thereby preventing the battery 4 from exploding due to an excessive internal pressure of the battery 4.

Figure 13:
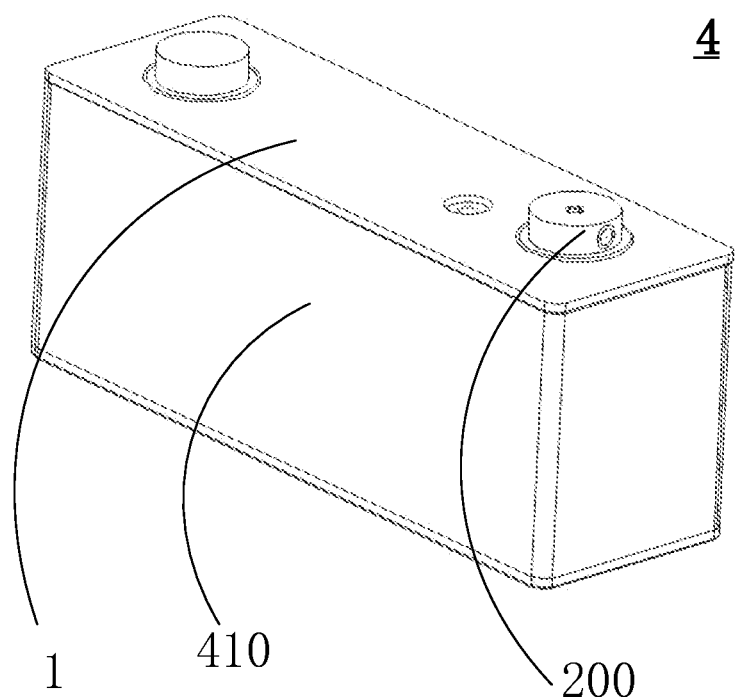
FIG. 13 is a schematic structural view of a battery in an implementation of the present disclosure.
Figure 14:
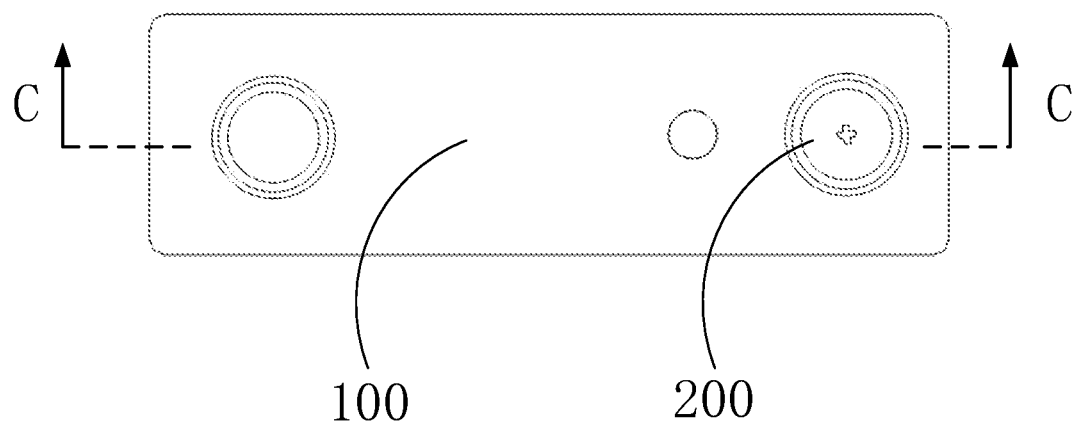
FIG. 14 is a top view of FIG. 13.
Figure 15:
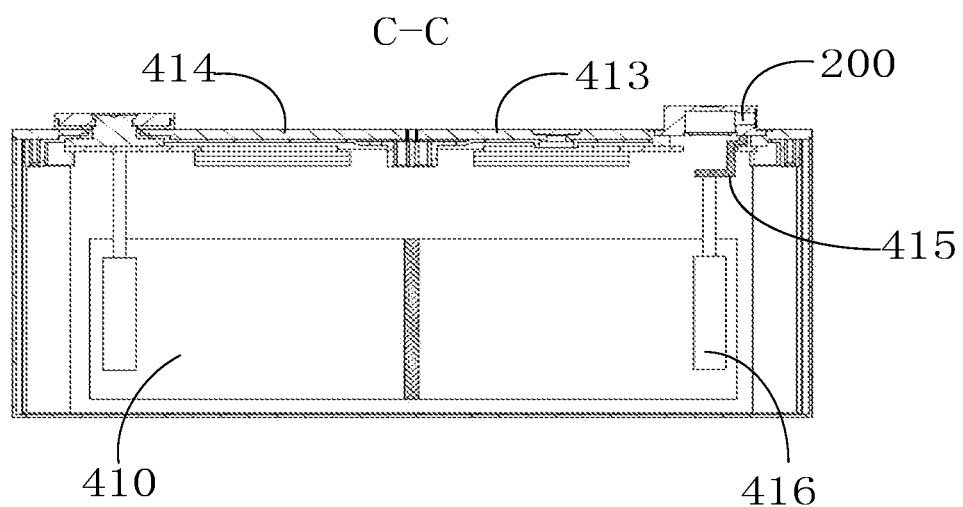
FIG. 15 is a cross-sectional view taken in direction C-C in FIG. 14.

Reference can be made to FIG. 13 to FIG. 15. In a possible implementation, a battery 4 is further provided in the present disclosure. The battery 4 includes a battery body 410 and the cover plate assembly 1 of the present disclosure. The cover plate assembly 1 is configured to seal the battery body 410, and configured to be electrically connected with an electricity-consumption device 6.

Optionally, the battery body 410 in the present disclosure is equipped with the cover plate assembly 1 in the present disclosure. The cover plate assembly 1 in the present disclosure has a simple manufacturing process, reduced costs, and good structural stability, such that manufacturing costs of the battery 4 in the present disclosure can also be reduced to a certain extent, and the battery 4 in the present disclosure has good structural stability and power supply stability.

Optionally, the cover plate assembly 1 in the present disclosure includes a positive-electrode cover plate 413 and a negative-electrode cover plate 414. The positive-electrode cover plate 413 and the negative-electrode cover plate 414 are arranged at two opposite ends of the battery body 410 respectively and are electrically connected with the battery body 410. The positive-electrode cover plate 413 and the negative-electrode cover plate 414 are configured to be electrically connected with the electricity-consumption device 6. At least one of the positive-electrode cover plate 413 and the negative-electrode cover plate 414 is the cover plate assembly 1 in implementations of the present disclosure.

Optionally, the battery 4 in the present disclosure includes a current collector 416 and an electrical connector 415. Optionally, the current collector 416 may be a positive-electrode current collector or a negative-electrode current collector. The electrical connector 415 may be a positive-electrode electrical connector or a negative-electrode electrical connector. The electrical connector 415 electrically connects the current collector 416 with the pole 200. The current collector 416 is configured to collect a current generated by the battery 4. The current is supplied to the pole 200 through the electrical connector 415. The pole 200 is configured to be electrically connected with an external electricity-consumption device 6 and supply power.

Reference can be made to FIG. 16. In a possible implementation, a method for assembling a battery 4 is further provided in the present disclosure. The assembling method includes the following.

S701, a cover plate 100 is provided. The cover plate 100 includes a cover plate body 110 and a carrier portion 120 connected with each other. The cover plate body 110 has a first surface 111 and a second surface 112 opposite to each other. The cover plate body 110 is disposed around an external periphery of the carrier portion 120. The carrier portion 120 is recessed from the first surface 111. The carrier portion 120 and the cover plate body 110 cooperatively define a first recess 130. The carrier portion 120 defines a first through hole 121 communicating with the first recess 130. When the cover plate assembly 1 is applied to the battery, the first surface 111 is closer to an outside of the battery than the second surface 112.

S702, the pole 200 is provided. The pole 200 is inserted into the first recess 130 from the first surface 111 of the cover plate 100. The pole 200 abuts against the carrier portion 120. The pole 200 is configured to be electrically connected with a current collector 416 of the battery. The pole 200 defines a second through hole 210. The pole 200 includes an abutting portion 220 and a pole body 230 connected with each other. The abutting portion 220 is disposed in the first recess 130 and abuts against the carrier portion 120. The pole body 230 exceeds the first surface 111. The second through hole 210 penetrates through the abutting portion 220 and the pole body 230. The second through hole 210 includes a first through sub-hole 211 and a second through sub-hole 212 that intersect and communicate with each other. The first through sub-hole 211 penetrates through a surface of the abutting portion 220 away from the pole body 230. The second through sub-hole 212 penetrates through a surface of the pole body 230 connected with the abutting portion 220.

S703, the explosion-proof assembly 300 is provided. The explosion-proof assembly 300 includes an explosion-proof valve 310 and a protective sheet 320. The explosion-proof valve 310 and the protective sheet 320 are disposed in the second through hole 210. The explosion-proof valve 310 is spaced apart from the protective sheet 320. The explosion-proof valve 310 is disposed in the first through sub-hole 211. The protective sheet 320 is disposed in the second through sub-hole 212. The explosion-proof valve 310 is disposed closer to the second surface 112 than the protective sheet 320. The explosion-proof valve 310 is configured to seal the second through hole 210.

Optionally, in the method for assembling the battery 4 in the present disclosure, the pole 200 is combined with the explosion-proof assembly 300 first. Specifically, the explosion-proof valve 310 is disposed at a side of the second through hole 210 close to the abutting hole 220 and disposed in the second through hole 210. The protective sheet is disposed at a side of the second through hole 210 close to the pole body 230 and disposed in the second through hole 210. The explosion-proof valve seals the second through hole 210. Subsequently, the cover plate 100 and a component formed by combining the explosion-proof assembly 300 and the pole 200 are assembled into the cover plate assembly 1 in the present disclosure. Specifically, the cover plate 100 includes the cover plate body 110, the cover plate body 110 includes the first surface 111, the carrier portion 120 is recessed from the first surface 111, and the carrier portion 120 and the cover plate body 110 cooperatively define the first recess 130. The pole 200 is disposed in the first recess 130 and abuts against the carrier portion 120, and then the pole 200 is fixed to the cover plate 100 to obtain the cover plate assembly 1. Then the cover plate assembly 1 and the battery body 410 are assembled into the battery 4 in the present disclosure. Specifically, the cover plate assembly 1 is fixed to the battery body, and the cover plate assembly 1 seals internal space of the battery body. The first surface is located at a side of the cover plate assembly 1 away from the battery body. Therefore, the battery 4 is obtained.

Optionally, the pole 200 is fixed to the cover plate 100 by welding.

In the battery 4 assembled by the assembling method provided in the present disclosure, the pole 200 penetrates through the first recess 130 from the first surface of the cover plate 100 and abuts against the carrier portion 120. The external force to which the pole 200 of the battery is subjected usually comes from outside extrusion. The pole abuts against the cover plate 100 on a surface the cover plate 100 facing the outside of the battery 4. When the pole 200 is extruded by the external force, the cover plate 100 strongly support the pole 200. In addition, the pole 200 is disposed in the first recess 130 of the cover plate 100, and since the first recess 130 is defined cooperatively by the carrier portion 120 and the cover plate body 110, the pole 200 in the first recess 130 can also be supported by the cover plate body 110 when the pole is subjected to the external pressures in other directions. In the battery 4 assembled by the assembling method provided in the present disclosure, when the force to which the pole 200 is subjected can be resolved into two component forces, where one is perpendicular to the extension direction of the cover plate 100 and the other is parallel to the extension direction of the cover plate 100, the carrier portion 120 can provide support for the component force perpendicular to the extension direction of the cover plate 100, and the cover plate body 110 can provide support for the component force parallel to the extension direction of the cover plate 100, such that the pole 200 and the cover plate assembly 1 have good structural stability. The cover plate assembly 1 provided in the present disclosure further includes the explosion-proof assembly 300. When the battery 4 is in normal operation, the explosion-proof valve 310 makes the inside of the battery 4 in the sealed and stable environment. When the battery 4 is abnormal and the internal pressure of the battery 4 rises, the explosion-proof valve 310 is broken and the second through hole 210 is no longer sealed, and the second through hole 210 communicates the inside of the battery 4 with the outside of the battery 4, such that the internal pressure of the battery 4 is released. The protective sheet 320 is disposed farther away from the second surface 112 than the explosion-proof valve 310 to protect the explosion-proof valve 310 from being damaged by the sharp and protruding object outside. Specifically, when an accident occurs to the battery 4 due to improper charging or short circuit, the internal temperature of the battery 4 will rise sharply and a large amount of gas will be generated. Here, the gas inside the battery 4 will break through the explosion-proof valve 310, and then rush out through the first through hole 121 to be discharged to the outside of the battery 4 through the second through hole 210, thereby completing pressure relief, preventing the explosion of the battery 4 and ensuring the safety of the battery 4.

Reference can be made to FIG. 17. In other implementations, the method for assembling the battery includes the following.

S801, a cover plate 100 is provided. The cover plate 100 includes a cover plate body 110 and a carrier portion 120 connected with each other. The cover plate body 110 has a first surface 111 and a second surface 112 opposite to each other. The cover plate body 110 is disposed around an external periphery of the carrier portion 120. The carrier portion 120 is recessed from the first surface 111. The carrier portion 120 and the cover plate body 110 cooperatively define a first recess 130. The carrier portion 120 defines a first through hole 121 communicating with the first recess 121. When the cover plate assembly 1 is applied to the battery, the first surface 111 is closer to an outside of the battery than the second surface 112.

S802, the pole 200 is provided. The pole 200 is inserted into the first recess 130 from the first surface of the cover plate 100. The pole 200 abuts against the carrier portion 120. The pole 200 is configured to be electrically connected with a current collector 416 of the battery. The pole 200 defines a second through hole 210. The pole 200 includes an abutting portion 220 and a pole body 230 connected with each other. The abutting portion 220 is disposed in the first recess 130 and abuts against the carrier portion 120. The pole body 230 exceeds the first surface 111. The second through hole 210 penetrates through the abutting portion 220 and the pole body 230. The second through hole 210 includes a first through sub-hole 211 and a second through sub-hole 212 that intersect and communicate with each other. The first through sub-hole 211 penetrates through a surface of the abutting portion 220 away from the pole body 230. The second through sub-hole 212 penetrates through a surface of the pole body 230 connected with the abutting portion 220.

S803, the explosion-proof assembly 300 is provided. The explosion-proof assembly 300 includes an explosion-proof valve 310 and a protective sheet 320. The explosion-proof valve 310 and the protective sheet 320 are disposed in the second through hole 210. The explosion-proof valve 310 is spaced apart from the protective sheet 320. The explosion-proof valve 310 is disposed in the first through sub-hole 211. The protective sheet 320 is disposed in the second through sub-hole 212. The explosion-proof valve 310 is disposed closer to the second surface 112 than the protective sheet 320. The explosion-proof valve 310 is configured to seal the second through hole 210.

S804, an electrical connector 415 and a battery body 410 are provided. The battery body 410 includes a current collector 416.

S805, the electrical connector 415 is electrically connected with the pole 200 and the current collector 416 respectively. The electrical connector 415 is inserted into the first through hole 121.

Optionally, in the method for assembling the battery 4 in the present disclosure, the cover plate 100 provided and the pole 200 provided are assembled into the cover plate assembly 1 in the present disclosure first, and then the cover plate assembly 1 and the battery body 410 are assembled into the battery 4 in the present disclosure. Specifically, the battery body 410 includes the current collector 416, the electrical connector 415 provided is electrically connected with the current collector 416 provided, and then the cover plate assembly 1 is fixedly connected with the battery body 410, and the electrical connector 415 is electrically connected with the pole 200. Therefore, after the cover plate assembly 1 seals the battery body 410, the battery body 410 can supply power to the outside through the electrical connector 415 and the pole 200.

It can be understood that the electrical connector 415 is inserted into the first through hole 121 as follows. One end of the electrical connector 415 close to the carrier portion 120 may be electrically connected (e.g., welded) with a surface of the pole facing the carrier portion 120, the electrical connector 415 may be inserted into the first through hole 121, and the other end of the electrical connector 415 away from the carrier portion 120 may be electrically connected with the current collector 416.

In the battery 4 assembled by the assembling method provided in the present disclosure, the battery 4 includes the electrical connector 415 and the current collector 416, the electrical connector 415 is electrically connected with the pole 200 and the current collector 416, and the electrical connector 415 is inserted into the first through hole 121. The current collector 416 is configured to collect the current generated by the battery 4. The current is supplied to the pole 200 through the electrical connector 415. The pole 200 is configured to be electrically connected with an external electricity-consumption device 6 and supply power. In the battery 4 assembled by the assembling method provided in the present disclosure, when the force to which the pole 200 is supplied can be resolved into two component forces, where one is perpendicular to the extension direction of the cover plate 100 and the other is parallel to the extension direction of the cover plate 100, the carrier portion 120 can provide support for the component force perpendicular to the extension direction of the cover plate 100, and the cover plate body 110 can provide support for the component force parallel to the extension direction of the cover plate 100, such that the pole 200 and the cover plate assembly 1 have good structural stability.

Figure 18:
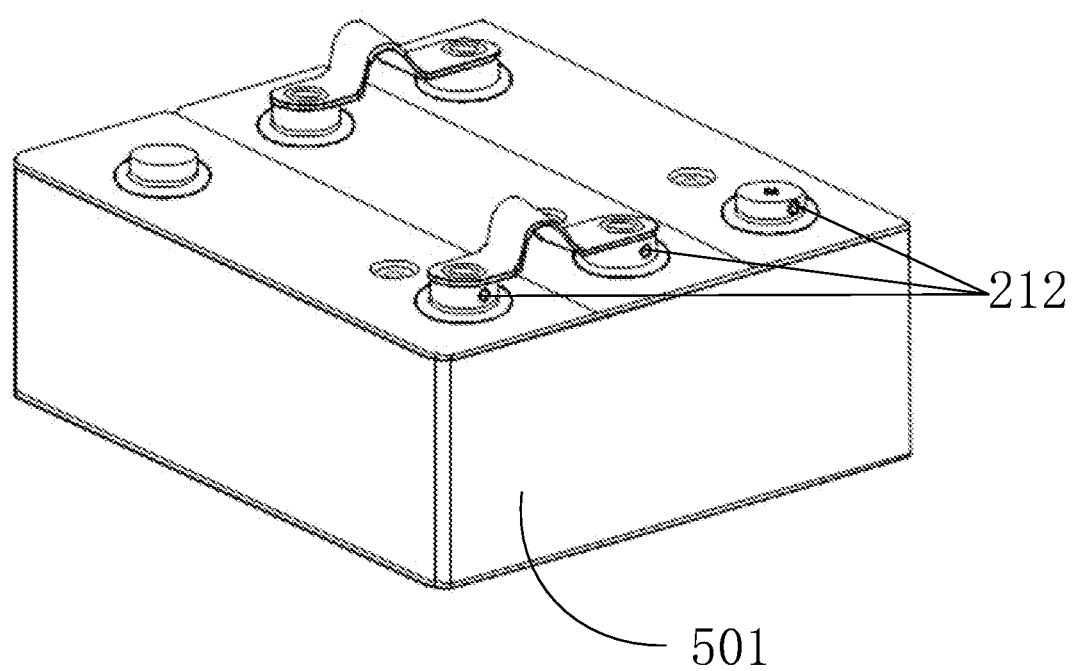
FIG. 18 is a schematic structural view of a battery pack in an implementation of the present disclosure.
Figure 19:
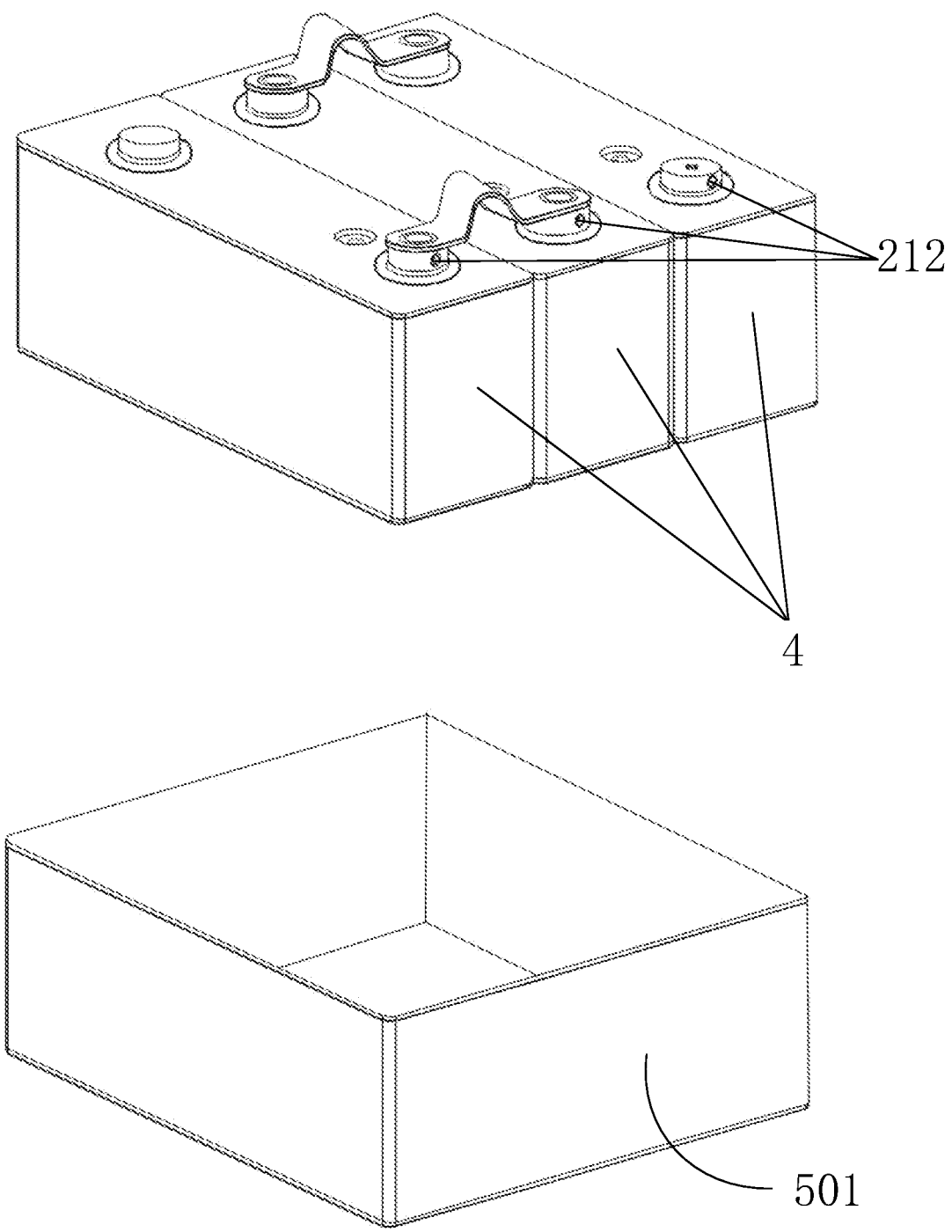
FIG. 19 is an exploded schematic view of a battery pack in an implementation of the present disclosure.

Reference can be made to FIG. 18 and FIG. 19. In a possible implementation, a battery pack 5 is further provided in implementations of the present disclosure. The battery pack 5 includes a box 501 and multiple batteries 4 in the implementations of the present disclosure. The multiple batteries 4 are accommodated in the box 501. The multiple batteries 4 are connected in series and/or in parallel.

Optionally, the multiple batteries 4 in the present disclosure are electrically connected with one another in series, in parallel, or in series-parallel. The series-parallel connection means that the multiple batteries 4 are connected with one another in series and in parallel. The battery 4 in the present disclosure has low manufacturing costs and good structural stability, such that the battery pack 5 in the present disclosure also has good structural stability and power supply stability. Optionally, the second through sub-hole 212 is defined on a surface of the pole body 230 where the pole body 230 is in contact with the abutting portion 220. When the multiple batteries 4 are electrically connected with one another, a component in the battery pack 5 which is configured to be electrically connected with the multiple batteries 4, electrically connects a surface of the pole body 230 of each of the multiple batteries 4 away from the abutting portion 220 with one another, so as to prevent the second through sub-hole 212 being shielded by the component configured to be electrically connected with the multiple batteries 4 in the battery pack 5, and avoid affecting the pressure relief of the battery 4 after an accident.

Figure 20:
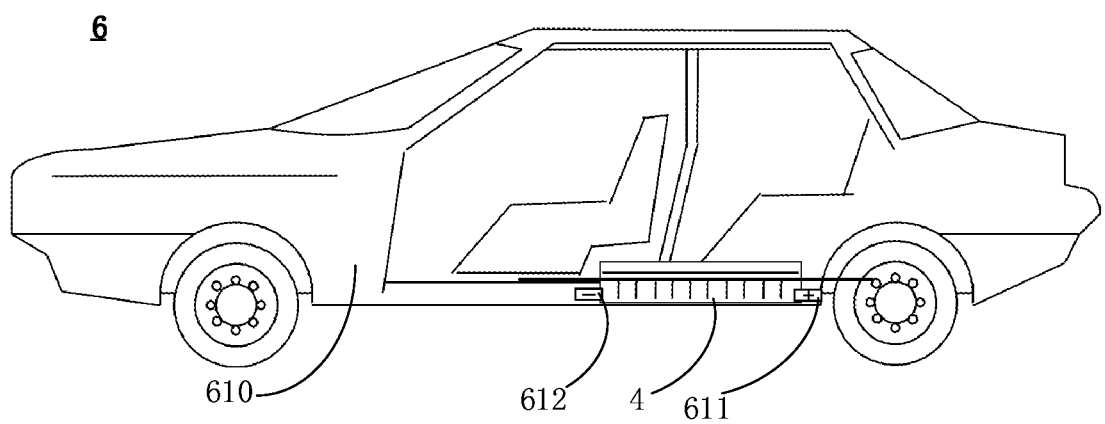
FIG. 20 is a schematic structural diagram of an electricity-consumption device in an implementation of the present disclosure.

Reference can be made to FIG. 20. In a possible implementation, an electricity-consumption device 6 is further provided in implementations of the present disclosure. The electricity-consumption device 6 includes an electricity-consumption device body 610 and the battery 4 in implementations of the present disclosure. The electricity-consumption device body 610 includes a device positive electrode 611 and a device negative electrode 612. The battery 4 is electrically connected with the device positive electrode 611 and the device negative electrode 612. The battery 4 is configured to supply power to the electricity-consumption device body 610.

Optionally, the electricity-consumption device 6 in the present disclosure may be, but is not limited to, one of a mobile phone, an image camera, a video camera, a notebook computer, an electric vehicle, and an electric bicycle. In implementations of the present disclosure, for illustrative purpose, the electricity-consumption device 6 is, for example, an electric vehicle illustrated in FIG. 20, which should not be construed as a limitation to the electricity-consumption device 6 and battery 4 in implementations of the present disclosure.

Optionally, reference can be made to FIG. 20. The electricity-consumption device 6 is an electric vehicle, and the battery 4 is configured to supply power to the electric vehicle. The battery 4 in the present disclosure adopts the cover plate assembly 1 in the present disclosure, and the pole 200 of the cover plate assembly 1 abuts against the cover plate 100, such that the pole 200 has good stability. The pole 200 defines a channel, the channel is able to communicate the inside of the battery 4 with the outside of the battery 4 and is used for pressure relief after an accident occurs inside the battery 4, such that the cover plate 100 can improve a safety performance of the battery 4 without punching a hole. When the battery 4 is used as the power supply of the electric vehicle, due to high stability and high safety of the battery 4, power supply stability and safety of the electric vehicle can still be ensured in case of collision and friction of the electric vehicle.

Although implementations of the present disclosure have been illustrated and described above, it can be understood that the above implementations are exemplary and cannot be understood as limitations to the present disclosure. Those of ordinary skill in the art can change, amend, replace, and modify the above implementations within the scope of the present disclosure, and these modifications and improvements are also regarded as the protection scope of the present disclosure.

What is claimed is:

1. A cover plate assembly, applied to a battery and comprising:
   a cover plate comprising a cover plate body and a carrier portion connected with each other, wherein the cover plate body has a first surface and a second surface opposite to each other, the cover plate body is disposed around an external periphery of the carrier portion, the carrier portion is recessed from the first surface, the carrier portion and the cover plate body cooperatively define a first recess, and the carrier portion defines a first through hole communicating with the first recess; and when the cover plate assembly is applied to the battery, the first surface is closer to an outside of the battery than the second surface;
   a pole disposed in the first recess, abutting against the carrier portion and configured to be electrically connected with a current collector of the battery, wherein the pole defines a second through hole, the pole comprises an abutting portion and a pole body connected with each other, the abutting portion is disposed in the first recess and abuts against the carrier portion, the pole body exceeds the first surface, and the second through hole penetrates through the abutting portion and the pole body; and
   an explosion-proof assembly comprising an explosion-proof valve and a protective sheet, wherein the explosion-proof valve and the protective sheet are disposed in the second through hole, the explosion-proof valve is spaced apart from the protective sheet, the explosion-proof valve is disposed closer to the second surface than the protective sheet, and the explosion-proof valve is configured to seal the second through hole, wherein
   the second through hole comprises a first through sub-hole and a second through sub-hole that communicate with each other in a bent manner, the first through sub-hole penetrates through a surface of the abutting portion away from the pole body, the explosion-proof valve is disposed in the first through sub-hole, the second through sub-hole penetrates through a surface of the pole body connected with the abutting portion, and the protective sheet is disposed in the second through sub-hole.

2. The cover plate assembly of claim 1, wherein the abutting portion exceeds the pole body in a direction perpendicular to an arrangement direction of the abutting portion and the pole body.

3. The cover plate assembly of claim 1, wherein the abutting portion has a first end surface away from the pole body, and the abutting portion further defines a second recess penetrating through the first end surface, the second recess communicates with the first through sub-hole, the second recess has a radial size larger than the first through sub-hole, and the explosion-proof valve is disposed in the second recess and abuts against the second recess at a bottom wall of the second recess.

4. A battery, comprising:
   a battery body; and
   a cover plate assembly, configured to seal the battery body, and configured to be electrically connected with an electricity-consumption device, wherein the cover plate assembly comprises:
   a cover plate comprising a cover plate body and a carrier portion connected with each other, wherein the cover plate body has a first surface and a second surface opposite to each other, the cover plate body is disposed around an external periphery of the carrier portion, the carrier portion is recessed from the first surface, the carrier portion and the cover plate body cooperatively define a first recess, and the carrier portion defines a first through hole communicating with the first recess; and when the cover plate assembly is applied to the battery, the first surface is closer to an outside of the battery than the second surface;
   a pole disposed in the first recess, abutting against the carrier portion and configured to be electrically connected with a current collector of the battery, wherein the pole defines a second through hole, the pole comprises an abutting portion and a pole body connected with each other, the abutting portion is disposed in the first recess and abuts against the carrier portion, the pole body exceeds the first surface, and the second through hole penetrates through the abutting portion and the pole body; and
   an explosion-proof assembly comprising an explosion-proof valve and a protective sheet, wherein the explosion-proof valve and the protective sheet are disposed in the second through hole, the explosion-proof valve is spaced apart from the protective sheet, the explosion-proof valve is disposed closer to the second surface than the protective sheet, and the explosion-proof valve is configured to seal the second through hole, wherein
   the second through hole comprises a first through sub-hole and a second through sub-hole that communicate with each other in a bent manner, the first through sub-hole penetrates through a surface of the abutting portion away from the pole body, the explosion-proof valve is disposed in the first through sub-hole, the second through sub-hole penetrates through a surface of the pole body connected with the abutting portion, and the protective sheet is disposed in the second through sub-hole.

5. The battery of claim 4, wherein the abutting portion exceeds the pole body in a direction perpendicular to an arrangement direction of the abutting portion and the pole body.

6. The battery of claim 4, wherein the abutting portion has a first end surface away from the pole body, and the abutting portion further defines a second recess penetrating through the first end surface, the second recess communicates with the first through sub-hole, the second recess has a radial size larger than the first through sub-hole, and the explosion-proof valve is disposed in the second recess and abuts against the second recess at a bottom wall of the second recess.

7. A method for assembling a battery, comprising:
   providing a cover plate, wherein the cover plate comprises a cover plate body and a carrier portion connected with each other, the cover plate body has a first surface and a second surface opposite to each other, the cover plate body is disposed around an external periphery of the carrier portion, the carrier portion is recessed from the first surface, the carrier portion and the cover plate body cooperatively define a first recess, and the carrier portion defines a first through hole communicating with the first recess; and when the cover plate assembly is applied to the battery, the first surface is closer to an outside of the battery than the second surface;
   providing a pole, wherein the pole is inserted into the first recess from the first surface of the cover plate, the pole abuts against the carrier portion, the pole is configured to be electrically connected with a current collector of the battery, the pole defines a second through hole, the pole comprises an abutting portion and a pole body connected with each other, the abutting portion is disposed in the first recess and abuts against the carrier portion, the pole body exceeds the first surface, and the second through hole penetrates through the abutting portion and the pole body; wherein the second through hole comprises a first through sub-hole and a second through sub-hole that communicate with each other in a bent manner, the first through sub-hole penetrates through a surface of the abutting portion away from the pole body, and the second through sub-hole penetrates through a surface of the pole body connected with the abutting portion; and providing an explosion-proof assembly, wherein the explosion-proof assembly comprises an explosion-proof valve and a protective sheet, the explosion-proof valve and the protective sheet are disposed in the second through hole, the explosion-proof valve is spaced apart from the protective sheet, the explosion-proof valve is disposed in the first through sub-hole, the protective sheet is disposed in the second through sub-hole, the explosion-proof valve is disposed closer to the second surface than the protective sheet, and the explosion-proof valve is configured to seal the second through hole.

8. The method for assembling the battery of claim 7, further comprising:

providing an electrical connector and a battery body, wherein the battery body comprises the current collector; and connecting the electrical connector with the pole and the current collector electrically respectively, wherein the electrical connector is inserted into the first through hole.

9. The cover plate assembly of claim 1, wherein the abutting portion has a first end surface away from the pole body, the pole body has a second end surface away from the abutting portion, and a peripheral side surface, the peripheral side surface is connected between the second end surface and the abutting portion, the first through sub-hole penetrates through the first end surface, and the second through sub-hole penetrates through the peripheral side surface.

* * * * *